United States Patent
Maksimovic et al.

(10) Patent No.: US 11,860,934 B2
(45) Date of Patent: Jan. 2, 2024

(54) DEVICE AND METHOD FOR DETECTING PARTIAL MATCHES BETWEEN A FIRST TIME VARYING SIGNAL AND A SECOND TIME VARYING SIGNAL

(71) Applicant: Fraunhofer-Gesellschaft zur Förderung der angewandten Forschung e.V., Munich (DE)

(72) Inventors: Milica Maksimovic, Ilmenau (DE); Patrick Aichroth, Ilmenau (DE); Luca Cuccovillo, Ilmenau (DE); Hanna Lukashevich, Ilmenau (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 163 days.

(21) Appl. No.: 17/097,764

(22) Filed: Nov. 13, 2020

(65) Prior Publication Data

US 2021/0064916 A1    Mar. 4, 2021

Related U.S. Application Data

(63) Continuation of application No. PCT/EP2019/062699, filed on May 16, 2019.

(30) Foreign Application Priority Data

May 17, 2018 (EP) .................................. 18173034
Sep. 3, 2018 (EP) .................................. 18192315

(51) Int. Cl.
*G06V 20/40* (2022.01)
*G06F 16/683* (2019.01)
(Continued)

(52) U.S. Cl.
CPC ............ *G06F 16/683* (2019.01); *G06F 18/22* (2023.01); *G06V 20/46* (2022.01); *G06V 20/48* (2022.01); *G10L 25/51* (2013.01)

(58) Field of Classification Search
CPC ...... G06K 9/6215; G06V 20/46; G06V 20/48; G10L 25/51; G06F 16/683; G06F 16/41
See application file for complete search history.

(56) References Cited

U.S. PATENT DOCUMENTS 6,542,869 B1 * 4/2003 Foote .................... G06F 16/634
704/E15.005
9,153,239 B1 * 10/2015 Postelnicu .............. G10L 25/18
(Continued)

FOREIGN PATENT DOCUMENTS

WO    2009/046438 A1    4/2009

OTHER PUBLICATIONS

I. Bisio et al., "A television channel real-time detector using smartphones," IEEE Transactions on Mobile Computing, vol. 99, No. PrePrints, p. 1, 2013.
(Continued)

*Primary Examiner* — Solomon G Bezuayehu
(74) *Attorney, Agent, or Firm* — Bridgeway IP Law Group, PLLC; Jihun Kim

(57) ABSTRACT

Device for detecting partial matches between a first time varying signal and a second time varying signal, the device including: a fingerprint extraction stage; and a matching stage, wherein each feature information of a first fingerprint is pairwise compared with each feature information of a second fingerprint; wherein the matching stage includes a similarity calculator stage; wherein the matching stage includes a matrix calculator stage configured for arranging similarity values in a similarity matrix having dimensions of $L_a \times L_b$, wherein an entry in the i-th row and j-th column of (Continued)

the similarity matrix is the similarity value calculated from the pair of the i-th feature information of the first fingerprint and of the j-th feature information of the second fingerprint; wherein the matching stage includes a detection stage configured for detecting the partial matches by evaluating a plurality of diagonals of the similarity matrix.

14 Claims, 16 Drawing Sheets

(51) Int. Cl.
  *G10L 25/51* (2013.01)
  *G06F 18/22* (2023.01)

(56) References Cited

U.S. PATENT DOCUMENTS

| | | | | |
|---|---|---|---|---|
| 9,578,279 | B1* | 2/2017 | Mysore Vijaya Kumar | H04N 21/8549 |
| 9,635,307 | B1* | 4/2017 | Mysore Vijaya Kumar | G06T 7/90 |
| 10,846,334 | B2* | 11/2020 | Roberts | G06F 16/683 |
| 10,861,436 | B1* | 12/2020 | Scodary | G06F 16/683 |
| 2003/0048946 | A1* | 3/2003 | Foote | G06F 18/23 382/173 |
| 2003/0160944 | A1* | 8/2003 | Foote | G11B 27/034 |
| 2003/0161396 | A1* | 8/2003 | Foote | G06F 16/739 707/E17.094 |
| 2003/0218696 | A1* | 11/2003 | Bagga | H04N 5/144 348/700 |
| 2006/0065106 | A1* | 3/2006 | Pinxteren | G10L 25/48 84/615 |
| 2006/0107216 | A1* | 5/2006 | Cooper | G06F 16/7847 382/173 |
| 2007/0288452 | A1* | 12/2007 | Podilchuk | G06F 18/22 707/999.005 |
| 2008/0288255 | A1* | 11/2008 | Carin | G06F 18/295 704/256.1 |
| 2008/0310734 | A1* | 12/2008 | Ahammad | G06V 20/40 382/209 |
| 2009/0175538 | A1* | 7/2009 | Bronstein | H04N 21/44008 382/173 |
| 2013/0064379 | A1* | 3/2013 | Pardo | H04S 7/40 381/56 |
| 2013/0289756 | A1* | 10/2013 | Resch | G06F 17/00 700/94 |
| 2014/0043543 | A1* | 2/2014 | Konuma | G10L 25/54 348/738 |
| 2014/0330413 | A1 | 11/2014 | Anniballi | |
| 2015/0199974 | A1* | 7/2015 | Bilobrov, I | G10L 19/018 700/94 |
| 2016/0012857 | A1* | 1/2016 | Leppänen | G11B 27/32 386/241 |
| 2016/0343135 | A1* | 11/2016 | De Haan | A61B 5/02416 |
| 2019/0156807 | A1* | 5/2019 | Ryynänen | G10H 1/40 |
| 2019/0205467 | A1* | 7/2019 | Wold | G06F 16/683 |
| 2020/0154165 | A1* | 5/2020 | Cohen | G06V 20/49 |
| 2020/0342024 | A1* | 10/2020 | Rafii | G06F 17/14 |

OTHER PUBLICATIONS

P. Cano et al., "A review of audio fingerprinting," Journal of VLSI signal processing systems for signal, image and video technology, vol. 41, No. 3, pp. 271-284, 2005.

J. Haitsma, "A highly robust audio fingerprinting system," in ISMIR, 2002, pp. 107-115.

E. Gomez et al., "Mixed watermarking-fingerprinting approach for integrity verification of audio recordings"; Proceedings of the International Telecommunications Symposium, 2002.

M. K. Mihçak et al., "A perceptual audio hashing algorithm: A tool for robust audio identification and Information Hiding"; Proceedings of 4th Information Hiding Workshop, 2001, pp. 51-65.

E. Allamanche et al., "Content-based identification of audio material using mpeg-7 low level description"; Proc. Int. Symposium on Music Information Retrieval (ISMIR); 2001.

A. L. Chun Wang et al., "An industrial-strength audio search algorithm"; Proceedings of the 4th International Conference on Music Information Retrieval, 2003.

M. Malekesmaeili et al., "A novel local audio fingerprinting algorithm"; 14th IEEE International Workshop on Multimedia Signal Processing (MMSP) 2012, Banff, AB, Canada, Sep. 17-19, 2012, 2012, pp. 136-140.

X. Anguera et al., "Mask: Robust local features for audio fingerprinting"; ICME. IEEE Computer Society, 2012, pp. 455-460.

M. Héritier et al., "Crim's content-based copy detection system for trecvid. trecvid 2009 online proceedings"; 2009.

H. Jégou et al., "BABAZ: A large scale audio search system for video copy detection"; IEEE International Conference on Acoustics, Speech and Signal Processing (ICASSP) 2012; Kyoto, Japan, Mar. 25-30, 2012, pp. 2369-2372.

C. Ouali et al., "A robust audio fingerprinting method for content-based copy detection"; CBMI, IEEE, 2014, pp. 1-6.

C. Ouali et al., "Fast audio fingerprinting system using GPU and a clustering-based technique"; IEEE/ACM Trans. Audio, Speech & Language Processing, vol. 24, No. 6, pp. 1106-1118, 2016, [Online]. Available: http://dx.doi.org/10.1109/TASLP.2016.2541303.

"Trec video retrieval evaluation: Trecvid" https://www-nlpir.nist.gov/projects/trecvid/.

R. Sonnleitner et al., "Robust quad-based audio fingerprinting"; IEEE/ACM Trans. Audio, Speech & Language Processing, vol. 24, No. 3, pp. 409-421, 2016.

M. A. Fischler et al., "Random sample consensus: A paradigm for model fitting with applications to image analysis and automated cartography"; Commun. ACM, vol. 24, No. 6, pp. 381-395, Jun. 1981, [Online]. Available: http://doi.acm.org/10.1145/358669.358692.

D. Ellis, "audfprint," https://github.com/dpwe/audfprint, 2014.

Jouni Paulus et al., "Audio-based music structure analysis"; Proceedings of the 11th International Society for Music Information Retrieval Conference (ISMIR), Utrecht, Netherlands, Aug. 9-13, 2010, pp. 625-636.

M. Goto, "A chorus-section detecting method for musical audio signals"; Proc. of IEEE International Conference on Acoustics, Speech, and Signal Processing, pp. 437-440, Hong Kong, 2003.

Y. Shiu et al., "Similar segment detection for music structure analysis via Viterbi algorithm"; Proc. of IEEE International Conference on Multimedia and Expo, pp. 789-792, Toronto, Ont., Canada, Jul. 2006.

C. Rhodes et al., "Algorithms for determining and labelling approximate hierarchical self-similarity"; Proc. of 8th International Conference on Music Information Retrieval, pp. 41-46, Vienna, Austria, Sep. 2007.

C. Grigoras, "Digital audio recording analysis—the electric network frequency criterion"; International Journal of Speech Language and the Law, vol. 12, No. 1, pp. 63-76, 2005.

Vijay Chandrasekhar et al., "Survey and evaluation of audio fingerprinting schemes for mobile query-by-example applications"; ISMIR, 2011.

Michele Covell et al., "Known-audio detection using waveprint: Spectrogram fingerprinting by wavelet hashing"; Proceedings of the IEEE International Conference on Acoustics, Speech, and Signal Processing (ICASSP), 2007.

Yan Ke et al., "Computer vision for music identification"; IEEE Computer Society Conference on Computer Vision and Pattern Recognition (CVPR'05), 20.

Milica Maksimovic et al., "Phylogeny analysis for MP3 and AAC coding transformations"; ICME, 2017.

\* cited by examiner

DEVICE AND METHOD FOR DETECTING PARTIAL MATCHES BETWEEN A FIRST TIME VARYING SIGNAL AND A SECOND TIME VARYING SIGNAL

CROSS-REFERENCES TO RELATED APPLICATIONS

This application is a continuation of copending International Application No. PCT/EP2019/062699, filed May 17, 2019, which is incorporated herein by reference in its entirety, and additionally claims priority from European Applications Nos. EP 18 173 034.2, filed May 17, 2018 and EP 18 192 315.2, filed Sep. 3, 2018, all of which are incorporated herein by reference in their entirety.

The invention refers to a device, a method and a computer program for detecting partial matches between a first time varying signal and a second time varying signal.

BACKGROUND OF THE INVENTION

Many applications may use a detection and localization of previously unknown matches between a first time varying signal and a second time varying signal.

A first approach according to known technology for detection and localization of such matches is the query-based classic matching approach. There is an large amount of well-established classic matching approaches, all of which aim at the identification of material, i.e. finding occurrences of a query item or parts of a query item within a given reference data base or dataset.

Such approaches typically involve extraction of fingerprints, which comprise feature information, from query items and reference items, and a respective matching or lookup approach. Due to the matching process being designed for identification, such approaches however cannot be used for detecting and localizing previously unknown partial overlaps—they may use knowledge of what to query for.

An implementation for classic matching is based on a Shazam-approach [1]. However, this approach has several limitations:

The Shazam-approach does not detect certain cases of partial reuse, e.g. where a segment within material was replaced with other material.

The Shazam-approach fails to address the use case requirement regarding localization, when localization with a tolerance of ~1-2 sec maximum may be used.

The Shazam-approach cannot auto-detect the amount of partial matches but instead may use this information to be provided by the user with too high or low numbers resulting in false-positives and false-negatives).

A second approach according to known technology for detection and localization of such matches is known as watermarking. Watermarking could theoretically be used to address the outlined problems, but this would only work if all relevant content would be watermarked by all relevant actors, for every single action performed upon the material, which is—considering cost, transparency and payload considerations, security considerations, etc.—completely unrealistic, and even then would not include the tremendous amount of content that is already existing.

A third according to known technology for detection and localization of such matches is a manual annotation and processing approach. Due to the lack of suitable technologies, manual annotation and analysis would be the only realistic option for addressing the outline use cases and problems. However, it is very difficult for humans to accurately annotate partial matches, resulting in tremendous cost, especially considering the every growing amount of material.

Due to the described limitations, the potential for increased efficiency and cost savings for the described use cases remains unexploited

SUMMARY

According to an embodiment, a device for detecting partial matches between a first time varying signal and a second time varying signal, in particular between a first audio signal and a second audio signal or between a first video signal and a second video signal may have: a fingerprint extraction stage configured for extracting a first fingerprint from the first time varying signal and for extracting a second fingerprint from the second time varying signal, wherein a plurality of first time frames is extracted from the first time varying signal for the first fingerprint, wherein a plurality of second time frames is extracted from the second time varying signal for the second fingerprint, wherein the first fingerprint includes for each of the first time frames a feature information corresponding to one or more characteristic features in the first time varying signal, which are related to the respective first time frame, and wherein the second fingerprint includes for each of the second time frames a feature information corresponding to one or more characteristic features in the second time varying signal, which are related to the respective second time frame; and a matching stage configured for comparing the first fingerprint and the second fingerprint, wherein each feature information of the first fingerprint is pairwise compared with each feature information of the second fingerprint; wherein the matching stage includes a similarity calculator stage configured for calculating for each pair of one of the feature informations of the first fingerprint and of one of the feature informations of the second fingerprint a similarity value; wherein the matching stage includes a matrix calculator stage configured for arranging the similarity values in a similarity matrix including dimensions of $L_a \times L_b$, wherein $L_a$ is a number of the feature informations of the first fingerprint and $L_b$ is a number of the feature informations of the second fingerprint, wherein an entry in the i-th row and j-th column of the similarity matrix is the similarity value calculated from the pair of the i-th feature information of the first fingerprint and of the j-th feature information of the second fingerprint; wherein the matching stage includes a detection stage configured for detecting the partial matches by evaluating a plurality of diagonals of the similarity matrix.

According to another embodiment, a method for detecting partial matches between a first time varying signal and a second time varying signal, in particular between a first audio signal and a second audio signal or between a first video signal and a second video signal, may have the steps of: extracting a first fingerprint from the first time varying signal and a second fingerprint from the second time varying signal, by using a fingerprint extraction stage, wherein a plurality of first time frames is extracted from the first time varying signal for the first fingerprint, wherein a plurality of second time frames is extracted from the second time varying signal for the second fingerprint, wherein the first fingerprint includes for each of the first time frames a feature information corresponding to one or more characteristic features in the first time varying signal, which are related to the respective first time frame, and wherein the second fingerprint includes for each of the second time frames a feature information corresponding to one or more characteristic features in the second time varying signal, which are related to the respective second time frame; and comparing the first fingerprint and the second fingerprint by using a matching stage, wherein each feature information of the first fingerprint is pairwise compared with each feature information of the second fingerprint; calculating, by using a similarity stage of the matching stage, a similarity value for each pair of one of the feature informations of the first fingerprint and of one of the feature informations of the second fingerprint; arranging, by using a matrix calculator stage of the matching stage, the similarity values in a similarity matrix including dimensions of $L_a \times L_b$, wherein $L_a$ is a number of the feature informations of the first fingerprint and $L_b$ is a number of the feature informations of the second fingerprint, wherein an entry in the i-th row and j-th column of the similarity matrix is the similarity value calculated from the pair of the i-th feature information of the first fingerprint and of the j-th feature information of the second fingerprint; and detecting, by using a detection stage of the matching stage, the partial matches by evaluating a plurality of diagonals of the similarity matrix.

Another embodiment may have a non-transitory digital storage medium having a computer program stored thereon to perform the method for detecting partial matches between a first time varying signal and a second time varying signal, in particular between a first audio signal and a second audio signal or between a first video signal and a second video signal, the method having the steps of: extracting a first fingerprint from the first time varying signal and a second fingerprint from the second time varying signal, by using a fingerprint extraction stage, wherein a plurality of first time frames is extracted from the first time varying signal for the first fingerprint, wherein a plurality of second time frames is extracted from the second time varying signal for the second fingerprint, wherein the first fingerprint includes for each of the first time frames a feature information corresponding to one or more characteristic features in the first time varying signal, which are related to the respective first time frame, and wherein the second fingerprint includes for each of the second time frames a feature information corresponding to one or more characteristic features in the second time varying signal, which are related to the respective second time frame; and comparing the first fingerprint and the second fingerprint by using a matching stage, wherein each feature information of the first fingerprint is pairwise compared with each feature information of the second fingerprint; calculating, by using a similarity stage of the matching stage, a similarity value for each pair of one of the feature informations of the first fingerprint and of one of the feature informations of the second fingerprint; arranging, by using a matrix calculator stage of the matching stage, the similarity values in a similarity matrix including dimensions of $L_a \times L_b$, wherein $L_a$ is a number of the feature informations of the first fingerprint and $L_b$ is a number of the feature informations of the second fingerprint, wherein an entry in the i-th row and j-th column of the similarity matrix is the similarity value calculated from the pair of the i-th feature information of the first fingerprint and of the j-th feature information of the second fingerprint; and detecting, by using a detection stage of the matching stage, the partial matches by evaluating a plurality of diagonals of the similarity matrix, when said computer program is run by a computer.

In a first aspect the invention refers to a device for detecting partial matches between a first time varying signal and a second time varying signal, in particular between a first audio signal and a second audio signal or between a first video signal and a second video signal. The device comprises:

a fingerprint extraction stage configured for extracting a first fingerprint from the first time varying signal and for extracting a second fingerprint from the second time varying signal, wherein a plurality of first time frames is extracted from the first time varying signal for the first fingerprint, wherein a plurality of second time frames is extracted from the second time varying signal for the second fingerprint, wherein the first fingerprint comprises for each of the first time frames a feature information corresponding to one or more characteristic features in the first time varying signal, which are related to the respective first time frame, and wherein the second fingerprint comprises for each of the second time frames a feature information corresponding to one or more characteristic features in the second time varying signal, which are related to the respective second time frame; and a matching stage configured for comparing the first fingerprint and the second fingerprint, wherein each feature information of the first fingerprint is pairwise compared with each feature information of the second fingerprint;

wherein the matching stage comprises a similarity calculator stage configured for calculating for each pair of one of the feature informations of the first fingerprint and of one of the feature informations of the second fingerprint a similarity value;

wherein the matching stage comprises a matrix calculator stage configured for arranging the similarity values in a similarity matrix having dimensions of $L_a \times L_b$, wherein $L_a$ is a number of the feature informations of the first fingerprint and $L_b$ is a number of the feature informations of the second fingerprint, wherein an entry in the i-th row and j-th column of the similarity matrix is the similarity value calculated from the pair of the i-th feature information of the first fingerprint and of the j-th feature information of the second fingerprint;

wherein the matching stage comprises a detection stage configured for detecting the partial matches by evaluating a plurality of diagonals of the similarity matrix.

A partial match between a first time varying signal and a second time varying signal exists, if a portion over time of the first time varying signal and a portion over time of the second time varying signal correspond to each other.

The first time varying signal and a second time varying signal in particular may be electrical signals. However, all other physical signals, which may be converted by a converter into electrical signals may be processed for detecting partial matches.

The fingerprint extraction stage is configured for extracting a first fingerprint from the first time varying signal and for extracting a second fingerprint from the second time varying signal.

Fingerprints are a set of data which characterizes the full length of the first signal to be processed or the full length of the second signal to be processed respectively. Time frames are portions of the first signal or the second signal respectively over time. Consecutive time frames may be overlapping or non-overlapping. Feature informations may correspond to any physical characteristic related to a time frame of the first signal or the second signal. For each time frame one of the feature information is computed.

The matching stage is configured for comparing each feature information of the first fingerprint pairwise compared with each feature information of the second fingerprint, wherein for each pair of feature information a similarity value is computed by using a similarity calculator stage of the matching stage.

The matrix calculator stage of the matching stage is configured for establishing a similarity matrix comprising the similarity values.

The detection stage of the matching stage is configured for detecting the partial matches by evaluating a plurality, in particular all, of diagonals of the similarity matrix. Diagonals are straight lines in a matrix which are parallel to the main diagonal of the matrix, wherein the main diagonal of the matrix comprises the entries having the same row index i in the column index j so that i is equal to j.

The partial matching approach, at its core, is based on the extraction of suitable fingerprints, a respective matching based on (a) a score calculation based on a frame-wise similarity matrix, and (b) an analysis of the similarity matrix with diagonal pattern detection, analysis and matching decision.

The device according to the invention is suitable for detection and accurate localization of previously unknown partial matches even if the partial matches are fairly short. Even short segments down to a few seconds may be detected. Moreover, the device is robust against noise in the first signal and the second signal. Furthermore, the device can handle larger data sets with increased computational efficiency.

Also, a significant benefit of the approach is that all analysis can be based on pairwise comparisons of fingerprints, which helps addressing scalability and update requirements, and security concerns.

The device according to the invention is suitable in particular for following applications:

Duplicate detection and repository cleanup: detection of partial duplicates within archives (especially productions archives) that were not tracked/annotated, which creates significant storage cost; currently, this can only be done manually, which results in significant cost.

Metadata tracking and cleanup: automatic propagation of metadata and validation of metadata within archives, including cases where content is imported from external sources (e.g. in the case of archive federation or external production), or created using legacy workflows; erroneous, incomplete and inconsistent metadata currently creates huge costs for archives and broadcasters.

Rights reporting: automatic reporting of partial use of copyrighted material (internal or external), which currently often needs to be done manually, or is very inaccurate, resulting in legal battles and respective costs.

Provenance tracking: end-to-end reporting of content provenance from source to end product over time and across channels, which is becoming increasingly important especially for public broadcasters.

Program/media structure analysis: analyzing media streams and distribution channels of broadcasters, to analyze programs structures (e.g. fraction of certain content types in radio stations).

News tracking: analyzing partial reuse of footage across different stations/channels over time, to evaluate "reporting habits" of stations/channels, and to understand how news evolves (what is used, what is left out), as a means of measuring journalistic quality.

Pre-processing for broadcast monitoring: detecting repeating material within streams including advertisement, station IDs etc. in order to use it for broadcast monitoring queries based on "classic matching".

Perceptual integrity: verifying integrity of content/content segments by detecting modifications which alter the perception (e.g. cutting and pasting of short segments), while being robust against modifications that do not perceptually alter material (e.g. transcoding).

Detecting and synchronizing content that stems from the same event: by detecting reused audio material, material that was e.g. recorded using different cameras at the same event can be quickly detected and synchronized.

Reuse and outreach measurement: detecting reuse of own material in external productions, to measure outreach and reuse, and hence effectiveness of PR work.

Usage monitoring/audience measurement: fine-grain detection of use/consumption of material.

Detecting repetitive events in streams (e.g. for acoustic monitoring): for recordings under stable conditions, it can be very useful to identify repetitive events within or among streams, to quickly identify and label them for training purposes.

Content registration and copyright checking: for systems that register content and/or collect content from many different sources, the originality of material may be determined, for which the detection of partial overlaps is important.

Pre-processing for plagiarism detection: similar to the registration and copyright case above, it is useful to detect partial matches (assuming a certain robustness against other audio material) for subsequent plagiarism detection.

Pre-processing for editing detection: detecting matches in a dataset can improve efficiency of editing detection substantially.

Pre-processing for compression formats: detecting partial reuse to realize simple lossless compression, saving storage cost.

According to some embodiments of the invention the characteristic features of each of the first time frames comprise a temporal and/or spectral shape of the first time varying signal, and the characteristic features of each of the second time frames comprise a temporal and/or spectral shape of the second time varying signal.

The temporal and/or spectral shape for one of the time frames may be calculated from the temporal and/or spectral shape of the respective time frame and/or from the temporal and/or spectral shape of neighboring time frames of the respective time frame.

According to some embodiments of the invention the feature information of each of the first time frames is a feature vector comprising a plurality of elements, and the feature information of each of the second time frames is a feature vector comprising a plurality of elements.

According to some embodiments of the invention the feature vector of each of the first time frames is calculated using one or more spectra related the respective first time frame, wherein each of the elements of the feature vector of each of the first time frames refers to a frequency band of the one or more spectra related to the respective first time frame, and wherein the feature vector of each of the second time frames is calculated using one or more spectra related to the respective second time frame, wherein each of the elements of the feature vector of each of the second time frames refers to a frequency band of the one or more spectra related to the respective second time frame.

According to some embodiments of the invention each similarity value of the similarity matrix is calculated using a distance between the feature vector of the respective first time frame and the feature vector of the respective second time frame.

The distance may be in particular an Euclidian distance.

According to some embodiments of the invention the similarity matrix is a binary similarity matrix, wherein each similarity value of the similarity matrix is, depending on a threshold for the respective distance, set to a first number indicating a frame match of the respective first time frame and the respective second time frame or to a second number indicating a frame mismatch of the respective first time frame and the respective second time frame.

A frame match refers to a similarity value of the similarity matrix which indicates that the feature information of the respective first time frame and the feature in formation of the respective second time frame are matching. A frame mismatch refers to a similarity value of the similarity matrix which indicates that the feature information of the respective first time frame and the feature in formation of the respective second time frame are not matching.

According to some embodiments of the invention the matching stage comprises a first pattern search stage configured for searching first patterns within the plurality of diagonals, which comprise one or more of the frame matches and zero or more frame mismatches being located between two of the frame matches of the respective first pattern, wherein a number of consecutive frame mismatches within the respective first pattern does not exceed a threshold for a maximum allowed number of consecutive frame mismatches within the respective first pattern, wherein a length of the respective first pattern from an earliest frame match of the respective first pattern to a latest frame match of the respective first pattern at least reaches a threshold for a minimum length of the first pattern, wherein the diagonals, in which at least one of the first patterns is found, are marked as candidate diagonals; and wherein the detection stage is configured for detecting the partial matches by evaluating the candidate diagonals of the similarity matrix.

Each of the first patterns starts at a frame match and ends at the frame match. However, the first patterns may comprise frame mismatches. The earliest frame match of the first pattern is the one frame match having the smallest indices. In contrast to that, the latest frame match of the first pattern is the one frame match having the largest indices.

According to some embodiments of the invention the detection stage is configured in such way that each of the first patterns, in which a ratio between a number of frame matches of the respective first pattern and the length of the respective first pattern reaches a threshold for the ratio between the number of frame matches of the respective first pattern and the length of the respective first pattern, is marked as one of the partial matches.

According to some embodiments of the invention the matching stage comprises a second pattern search stage configured for searching second patterns within the candidate diagonals, which comprise one or more of the first patterns and one or more frame mismatches between two of the first patterns, wherein a number of consecutive frame mismatches between two of the first patterns does not exceed a threshold for a maximum allowed number of consecutive frame mismatches between two of the first patterns, wherein a length of the respective second pattern from an earliest frame match of the respective second pattern to a latest frame match of the respective second pattern at least reaches a threshold for a minimum length of the second pattern; and wherein the detection stage is configured for detecting the partial matches by evaluating the second patterns of the candidate diagonals.

Each of the second patterns starts at a frame match and ends at the frame match. However, the first patterns within the second pattern may comprise frame mismatches. Likewise, between the first patterns frame mismatches may exist. The earliest frame match of the second pattern is the one frame match having the smallest indices. In contrast to that, the latest frame match of the second pattern is the one frame match having the largest indices.

According to some embodiments of the invention the detection stage is configured in such way that each of the second patterns, in which a ratio between a number of frame matches of the respective second pattern and the length of the respective second pattern reaches a threshold for the ratio between the number of frame matches of the respective second pattern and the length of the respective second pattern, is marked as one of the partial matches.

According to some embodiments of the invention the matching stage comprises a clean-up stage configured for receiving at least some of the partial matches detected by the detection stage and for determining a longest partial match of the received partial matches, wherein the longest partial match of the received partial matches is a main diagonal of a rectangular portion of the similarity matrix, wherein a further partial match of the received partial matches, which extends at least partially into the rectangular portion of the similarity matrix is discarded, unless following conditions are met:

an absolute value of a horizontal distance between an earliest frame match of the longest received partial match and an earliest frame match of the further received partial match exceeds a distance threshold;

an absolute value of a vertical distance between the earliest frame match of the longest received partial match and the earliest frame match of the other received partial match exceeds the distance threshold;

an absolute value of a horizontal distance between a latest frame match of the longest received partial match and a latest frame match of the further received partial match exceeds a distance threshold; and an absolute value of a vertical distance between the latest frame match of the longest received partial match and the latest frame match of the further received partial match exceeds the distance threshold; and a row index of the latest frame match of the further received partial match is greater than a row index of the latest frame match of the longest received partial match, in case that a column index of the latest frame match of the further received partial match is greater than a column index of the latest frame match of the longest received partial match;

wherein the not discarded partial matches are outputted.

The main diagonal of the rectangular portion of the similarity matrix is parallel to the main diagonal of the similarity matrix and a longest diagonal of the rectangular portion of the similarity matrix. The rectangular portion may be square.

By these features false partial matches due to repeating portions of signals may be discarded.

According to some embodiments of the invention the matching stage comprises a noise and silence processing stage configured for receiving at least some of the partial matches detected by the detection stage and for discarding one of the received partial matches, in case that the one of the received partial matches is wrongly detected due to noisy or silent portions in the first time varying signal and the second time varying signal, wherein the one of the received partial matches is a main diagonal of a further rectangular portion of the similarity matrix, wherein a noise ratio between a number of the frame matches in the further rectangular portion of the similarity matrix excluding the frame matches of the main diagonal of the further rectangular portion of the similarity matrix and a number of the similarity values in the further rectangular portion of the similarity matrix excluding the similarity values of the main diagonal of the further rectangular portion of the similarity matrix is calculated, wherein the one of the marked partial matches is discarded depending on a threshold for the noise ratio, wherein the not discarded partial matches are outputted.

By these features false partial matches due to quiet or noisy portions of signals may be discarded.

In a further aspect the invention refers to a method for detecting partial matches between a first time varying signal and a second time varying signal, in particular between a first audio signal and a second audio signal or between a first video signal and a second video signal. The method comprising the steps of:

extracting a first fingerprint from the first time varying signal and a second fingerprint from the second time varying signal, by using a fingerprint extraction stage, wherein a plurality of first time frames is extracted from the first time varying signal for the first fingerprint, wherein a plurality of second time frames is extracted from the second time varying signal for the second fingerprint, wherein the first fingerprint comprises for each of the first time frames a feature information corresponding to one or more characteristic features in the first time varying signal, which are related to the respective first time frame, and wherein the second fingerprint comprises for each of the second time frames a feature information corresponding to one or more characteristic features in the second time varying signal, which are related to the respective second time frame; and comparing the first fingerprint and the second fingerprint by using a matching stage, wherein each feature information of the first fingerprint is pairwise compared with each feature information of the second fingerprint;

calculating, by using a similarity stage of the matching stage, a similarity value for each pair of one of the feature informations of the first fingerprint and of one of the feature informations of the second fingerprint;

arranging, by using a matrix calculator stage of the matching stage, the similarity values in a similarity matrix having dimensions of $L_a \times L_b$, wherein $L_a$ is a number of the feature informations of the first fingerprint and $L_b$ is a number of the feature informations of the second fingerprint, wherein an entry in the i-th row and j-th column of the similarity matrix is the similarity value calculated from the pair of the i-th feature information of the first fingerprint and of the j-th feature information of the second fingerprint; and detecting, by using a detection stage of the matching stage, the partial matches by evaluating a plurality of diagonals of the similarity matrix.

In a further aspect the invention refers to a computer program for, when running on a processor, executing the method according to the invention.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
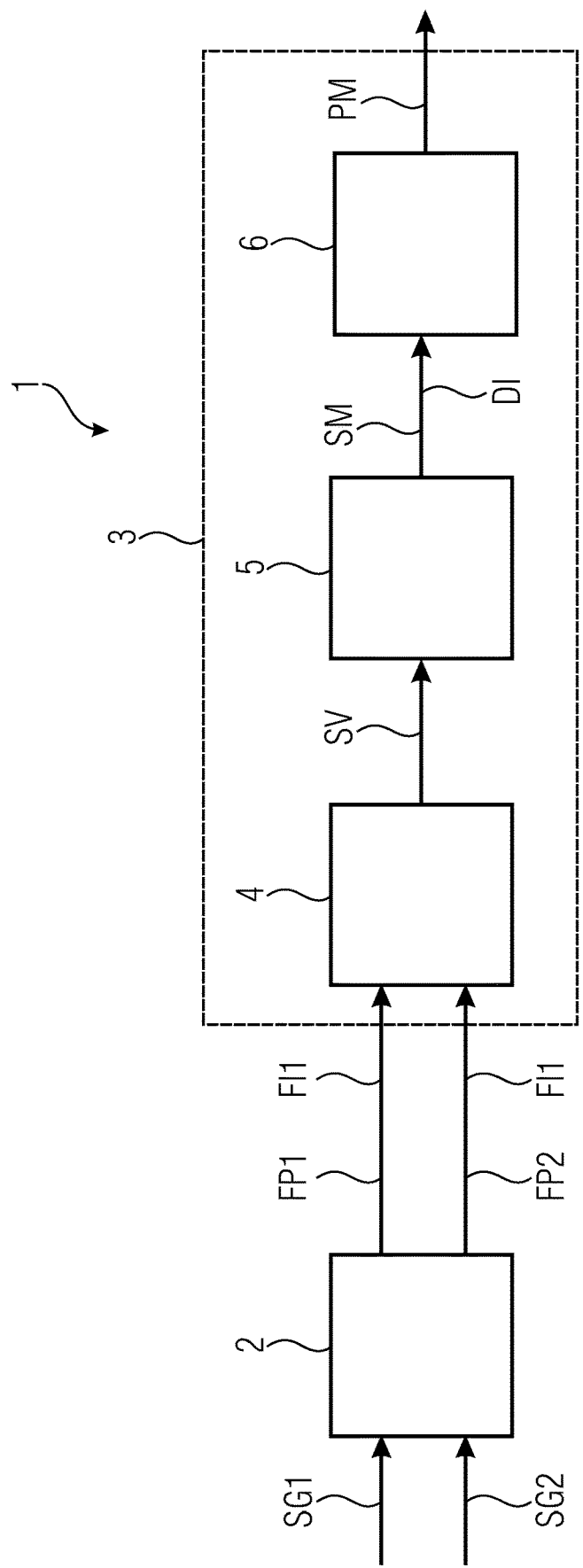
FIG. 1 illustrates a first embodiment of a device for detecting partial matches between a first time varying signal and a second time varying signal according to the invention in a schematic view.

Equal or equivalent elements or elements with equal or equivalent functionality are denoted in the following description by equal or equivalent reference numerals.

In the following description, a plurality of details is set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

FIG. 1 illustrates a first embodiment of a device 1 for detecting partial matches between a first time varying signal SG1 and a second time varying signal SG2 according to the invention in a schematic view.

The device 1 is configured for detecting partial matches PM between a first time varying signal SG1 and a second time varying signal SG2, in particular between a first audio signal SG1 and a second audio signal SG2 or between a first video signal SG1 and a second video signal SG2. The device 1 comprises:

a fingerprint extraction stage 2 configured for extracting a first fingerprint FP1 from the first time varying signal SG1 and for extracting a second fingerprint FP2 from the second time varying signal SG2, wherein a plurality of first time frames TF1 is extracted from the first time varying signal SG1 for the first fingerprint FP1, wherein a plurality of second time frames TF2 is extracted from the second time varying signal SG2 for the second fingerprint FP2, wherein the first fingerprint FP1 comprises for each of the first time frames TF1 a feature information FI1 corresponding to one or more characteristic features in the first time varying signal SG1, which are related to the respective first time frame TF1, and wherein the second fingerprint FP2 comprises for each of the second time frames TF2 a feature information FI2 corresponding to one or more characteristic features in the second time varying signal SG2, which are related to the respective second time frame TF2; and a matching stage 3 configured for comparing the first fingerprint FP1 and the second fingerprint FP2, wherein each feature information FI1 of the first fingerprint FP1 is pairwise compared with each feature information FI2 of the second fingerprint FP2;

wherein the matching stage 3 comprises a similarity calculator stage 4 configured for calculating for each pair of one of the feature informations FI1 of the first fingerprint FP1 and of one of the feature informations FI2 of the second fingerprint FP2 a similarity value SV;

wherein the matching stage 3 comprises a matrix calculator stage 5 configured for arranging the similarity values SV in a similarity matrix SM having dimensions of $L_a \times L_b$, wherein $L_a$ is a number of the feature informations FI1 of the first fingerprint FP1 and $L_b$ is a number of the feature informations FI2 of the second fingerprint FP2, wherein an entry in the i-th row and j-th column of the similarity matrix SM is the similarity value SV calculated from the pair of the i-th feature information FI1 of the first fingerprint FP1 and of the j-th feature information FI2 of the second fingerprint FP2;

wherein the matching stage 3 comprises a detection stage 6 configured for detecting the partial matches PM by evaluating a plurality of diagonals DI of the similarity matrix SM.

In a further aspect the invention refers to a method for detecting partial matches between a first time varying signal SG1 and a second time varying signal SG1, in particular between a first audio signal SG1 and a second audio signal SG2 or between a first video signal SG1 and a second video signal SG2. The method comprises the steps of:

extracting a first fingerprint FP1 from the first time varying signal SG1 and a second fingerprint FP2 from the second time varying signal SG2, by using a fingerprint extraction stage 2, wherein a plurality of first time frames TF1 is extracted from the first time varying signal SG1 for the first fingerprint FP1, wherein a plurality of second time frames TF2 is extracted from the second time varying signal SG2 for the second fingerprint FP2, wherein the first fingerprint FP1 comprises for each of the first time frames TF1 a feature information FI1 corresponding to one or more characteristic features in the first time varying signal SG1, which are related to the respective first time frame TF1, and wherein the second fingerprint FP2 comprises for each of the second time frames TF2 a feature information corresponding to one or more characteristic features in the second time varying signal SG2, which are related to the respective second time frame TF2; and comparing the first fingerprint FP1 and the second fingerprint FP2 by using a matching stage 3, wherein each feature information FI1 of the first fingerprint FP1 is pairwise compared with each feature information FI2 of the second fingerprint FP2;

calculating, by using a similarity stage 4 of the matching stage 3, a similarity value SV for each pair of one of the feature informations FI1 of the first fingerprint FP1 and of one of the feature informations FI2 of the second fingerprint FP2;

arranging, by using a matrix calculator stage 5 of the matching stage 3, the similarity values SV in a similarity matrix SM having dimensions of $L_a \times L_b$, wherein $L_a$ is a number of the feature informations FI1 of the first fingerprint FP1 and $L_b$ is a number of the feature informations FI2 of the second fingerprint FP2, wherein an entry in the i-th row and j-th column of the similarity matrix SM is the similarity value SV calculated from the pair of the i-th feature information FI1 of the first fingerprint FP2 and of the j-th feature information FI2 of the second fingerprint FP2; and detecting, by using a detection stage 6 of the matching stage 3, the partial matches PM by evaluating a plurality of diagonals DI of the similarity matrix SM.

In a further aspect the invention refers to a computer program for, when running on a processor, executing the method according to the invention.

Figure 2:
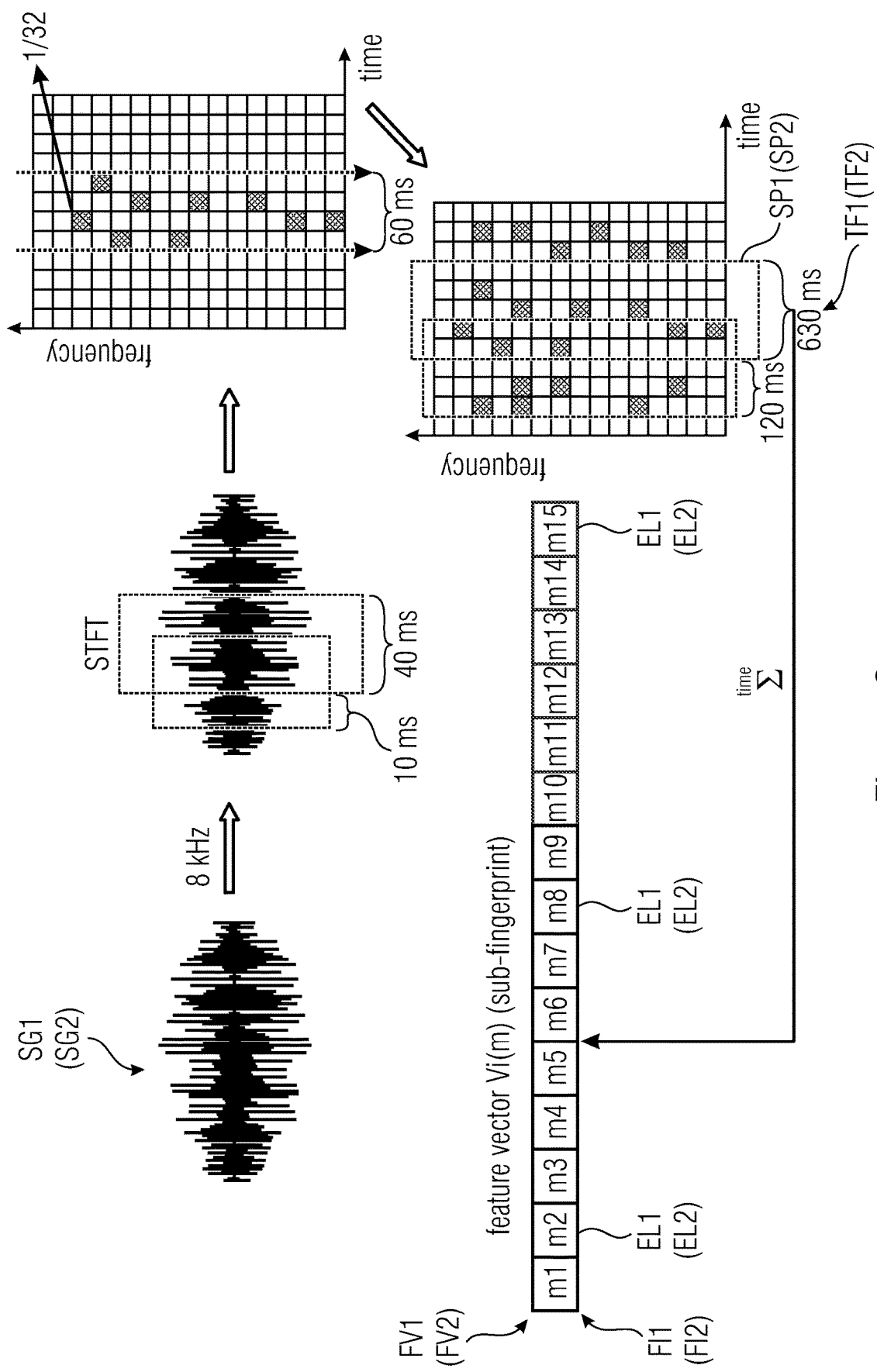
FIG. 2 illustrates an exemplary mode of operation of an embodiment of a fingerprint extraction stage of a device according to the invention in a schematic view.

FIG. 2 illustrates an exemplary mode of operation of an embodiment of a fingerprint extraction stage 2 of a device according to the invention in a schematic view.

According to some embodiments of the invention the characteristic features of each of the first time frames TF1 comprise a temporal and/or spectral shape of the first time varying signal SG1, and the characteristic features of each of the second time frames TF2 comprise a temporal and/or spectral shape of the second time varying signal SG2.

According to some embodiments of the invention the feature information FI1 of each of the first time frames TF1 is a feature vector FV1 comprising a plurality of elements EL1, and the feature information FI2 of each of the second time frames TF2 is a feature vector FV2 comprising a plurality of elements EL2.

According to some embodiments of the invention the feature vector FV1 of each of the first time frames TF1 is calculated using one or more spectra SP1 related to the respective first time frame TV1, wherein each of the elements EL1 of the feature vector FV1 of each of the first time frames TF1 refers to a frequency band of the one or more spectra SP1 related to the respective first time frame TF1, and wherein the feature vector FV2 of each of the second time frames TF2 is calculated using one or more spectra SP2 related to the respective second time frame TF2, wherein each of the elements EL2 of the feature vector FV2 of each of the second time frames TF2 refers to a frequency band of the one or more spectra SP2 related to the respective second time frame TF2.

According to some embodiments of the invention the first signal SG1 and the second signal SG2 are audio signal. The proposed process to extract an audio fingerprint FP1, FP2 of audio signals SG1 and SG2 for partial audio matching, which is optimized for efficient/fast subsequent matching (being less robust against noise), may be as follows:

1. Downsample the audio signals SG1 and SG2 to 8 kHz.
2. Compute the short-time Fourier transform (STFT) S(t,f) of audio signals SG1 and SG2 using Hamming 40 ms window with 10 ms hop size.
3. From the spectrogram S(t,f), select 15 non-overlapping frequency bands in range 300-3000 Hz with logarithmic spacing deriving $S_{log}(t,m)$, with $m \in \{1, \ldots, 15\}$.
4. Split $S_{log}(t,m)$ in several sub-matrices, corresponding to 60 ms of content (no overlap)
5. For every sub-matrix, select the 32 spectrogram peaks with the highest energy and map their locations in a binary matrix $S_{max}(t,m)$.
6. The binary matrix $S_{max}(t,m)$ is framed into binary sub-matrices $S_l(t,m)$, corresponding to 630 ms of content, using hop of 120 ms. Where, $l \in \{1, \ldots, L\}$ represents the index of the l-th binary sub-matrix, and L the total amount of binary sub-matrices.
7. For every binary sub-matrix $S_l(t,m)$ from the previous step, compute its sum over time $S_l(m)$.
8. The sum $S_l(m)$ can be used directly as the final feature vector $V_l(m)$. Alternatively, $V_l(m)$ can obtained normalizing $S_l(m)$ by its norm1, so that sum($V_l(m)$)=1. Each feature vector $V_l(m)$ describes 630 ms of content, corresponding to one of sub-matrices from step 7. Due to the 120 ms hop, we have a final feature matrix F(m,l) with $m \in \{1, \ldots, 15\}$ values every 120 ms and $l \in \{1, \ldots, L\}$ representing the index of the l-th feature vector where L is the total amount of feature vectors.

Figure 3:
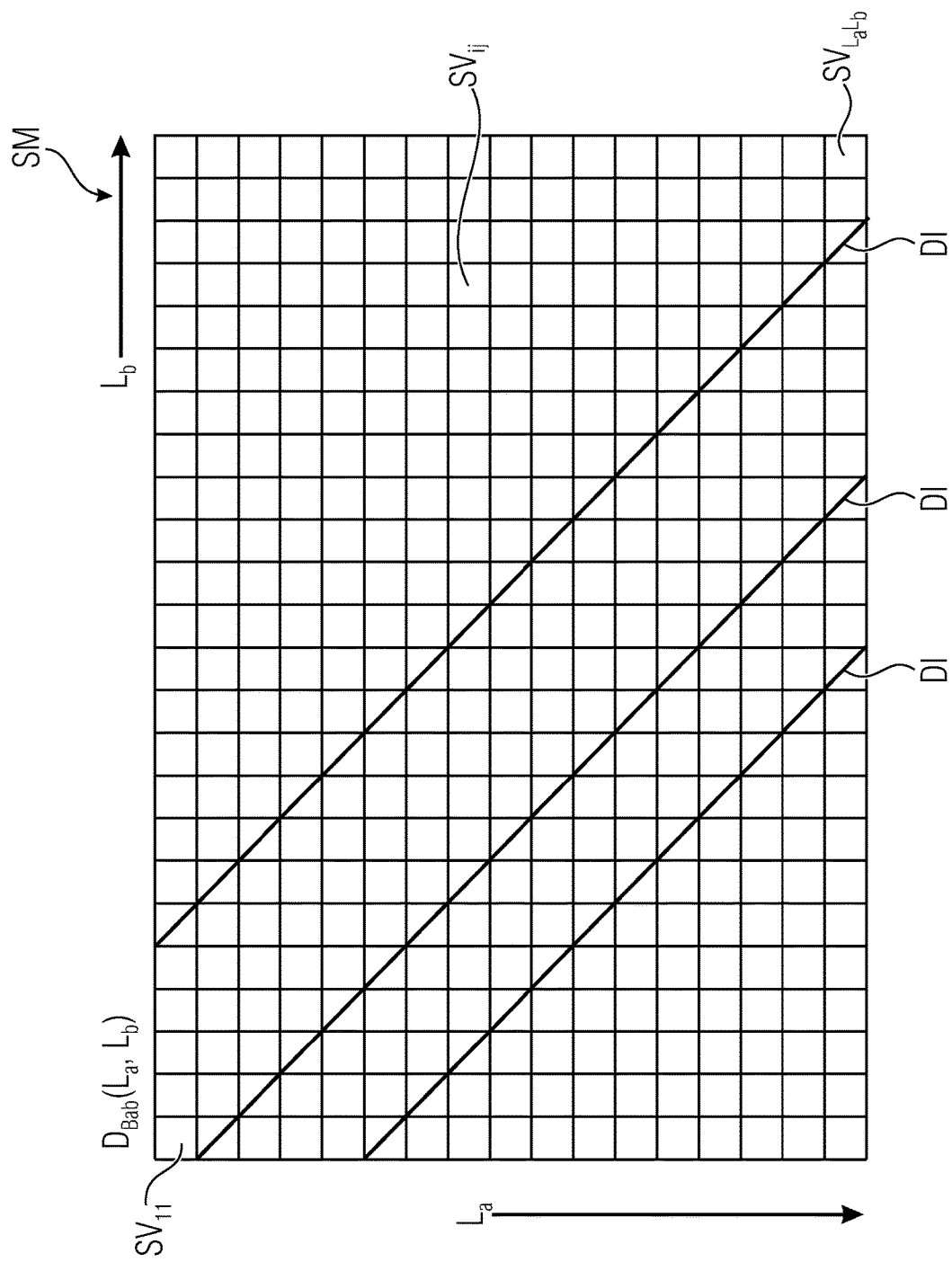
FIG. 3 illustrates an exemplary format of a similarity matrix of an embodiment of a matrix calculator stage of a device according to the invention in a schematic view.

FIG. 3 illustrates an exemplary format of a similarity matrix SM of an embodiment of a matrix calculator stage 5 of a device 1 according to the invention in a schematic view.

According to some embodiments of the invention each similarity value SV of the similarity matrix SM is calculated using a distance between the feature vector FV1 of the respective first time frame TF1 and the feature vector FV2 of the respective second time frame TF2.

According to some embodiments of the invention the similarity matrix SM is a binary similarity matrix SM, wherein each similarity value SV of the similarity matrix SM is, depending on a threshold for the respective distance, set to a first number indicating a frame match of the respective first time frame TF1 and the respective second time frame TF2 or to a second number indicating a frame mismatch of the respective first time frame TF1 and the respective second time frame TF2.

The exemplary similarity matrix SM of FIG. 3 comprises $L_a$ rows and $L_b$ columns. Each entry of the similarity matrix SM is a similarity value SV having the indices i for the row and j for the columns. The similarity matrix SM total comprises $L_a \times L_b$ similarity values SV, wherein only three similarity values SV are indicated by reference signs. In FIG. 3 exemplary diagonals DI are shown. However, a person skilled in the art will understand that more diameters diagonals DI exist, wherein each of the diagonals DI starts at an entry of the first row or at an entry of the first column of the similarity matrix SM and ends at an entry of the last row or at an entry of the last column of the similarity matrix SM.

According to some embodiments of the invention the actual segment matching, i.e. comparison of two fingerprints after extraction, may be performed as follows:

The fingerprint pairs FP1 and FP2 may be compared using an appropriate distance measure (i.e. appropriate to the fingerprint used, e.g. Euclidian distance in the case of the proposed fingerprint FP1, FP2). The comparison of the first fingerprint FP1 with the second fingerprint FP2 results in a similarity matrix SM ($D_{ab}(L_a, L_b)$), where $L_a$ is the amount of feature vectors FV1 from the first fingerprint FP1 and $L_b$ is the number of feature vectors FV2 from the second fingerprint FP2. In both fingerprints, the order of the feature vectors respects the temporal order of the corresponding time frames.

After applying a threshold to the similarity matrix SM ($D_{ab}$), a binary similarity matrix SM ($D_{Bab}$) is obtained which represents the matching between two fingerprints FP1 and FP2.

Figure 4:
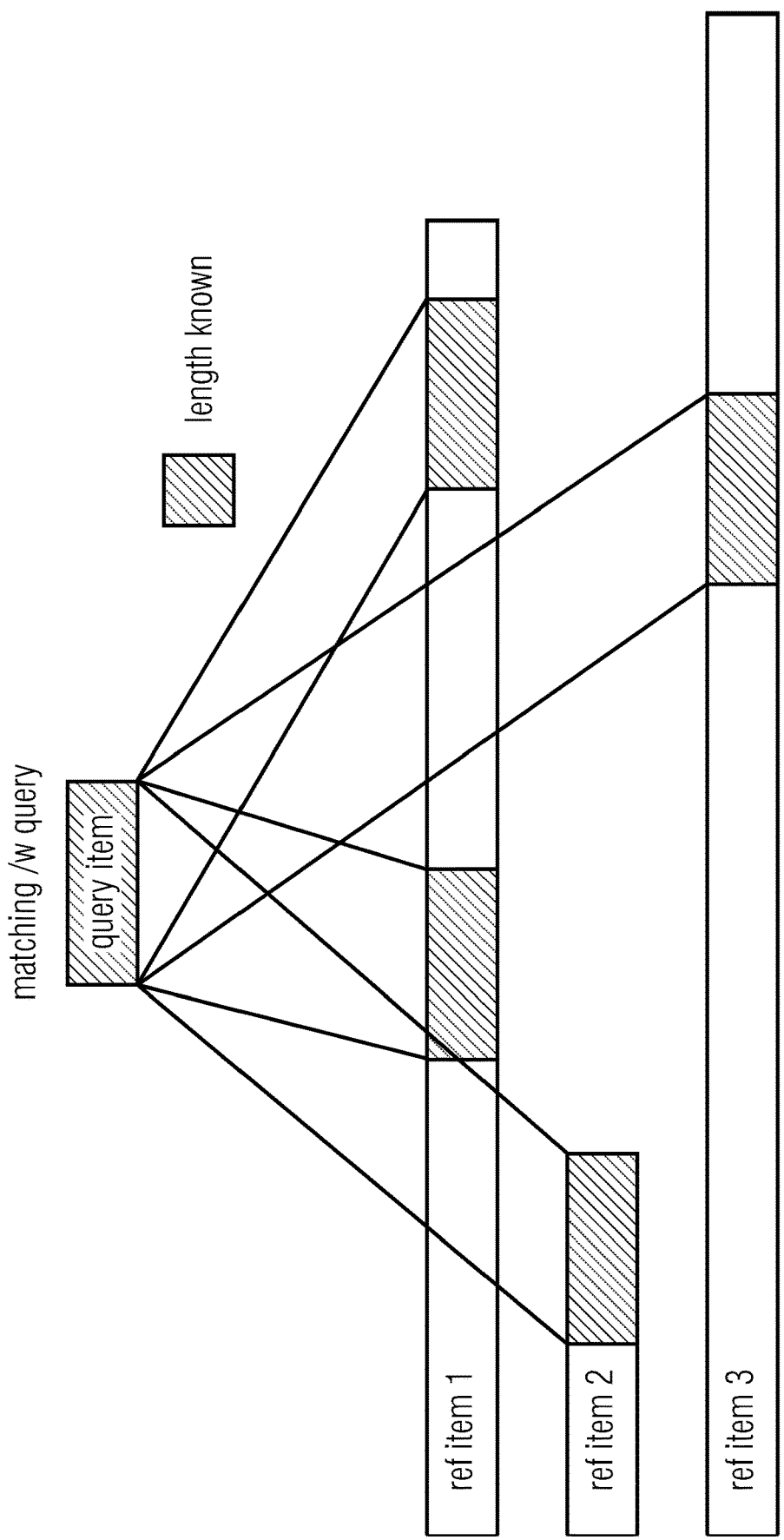
FIG. 4 illustrates a concept of classic matching of a first time varying signal and a second time varying signal, which is used in known technology.

FIG. 4 illustrates a concept of classic matching of a first time varying signal SG1 and a second time varying signal SG2, which is used in known technology.

Figure 5:
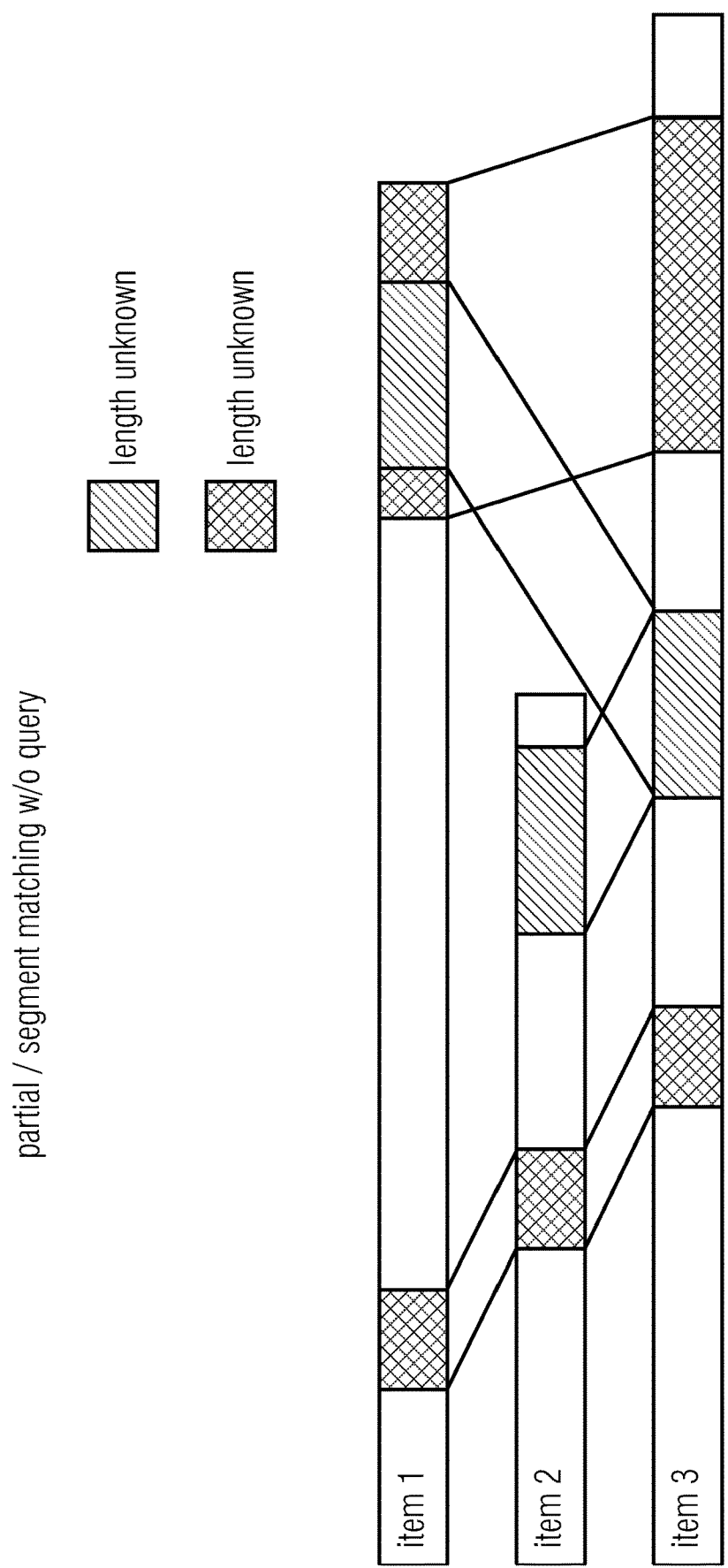
FIG. 5 illustrates a concept of partial matching of a first time varying signal and a second time varying signal, which is used according to the invention.

FIG. 5 illustrates a concept of partial matching of a first time varying signal SG1 and a second time varying signal SG2, which is used according to the invention.

FIGS. 4 and 5 illustrate the difference between the partial matching (segment matching) and classic matching. The problems posed in both cases are different: Classic matches aims at an efficient and robust lookup of a query, while the use case problems described previously may use (at least to some extent) partial matching without a query, requiring a completely different matching approach.

Beyond this general problem, it is also important to note that several of the use case problems directly result from common actions performed upon material, with some actions raising specific problems.

Figure 6:
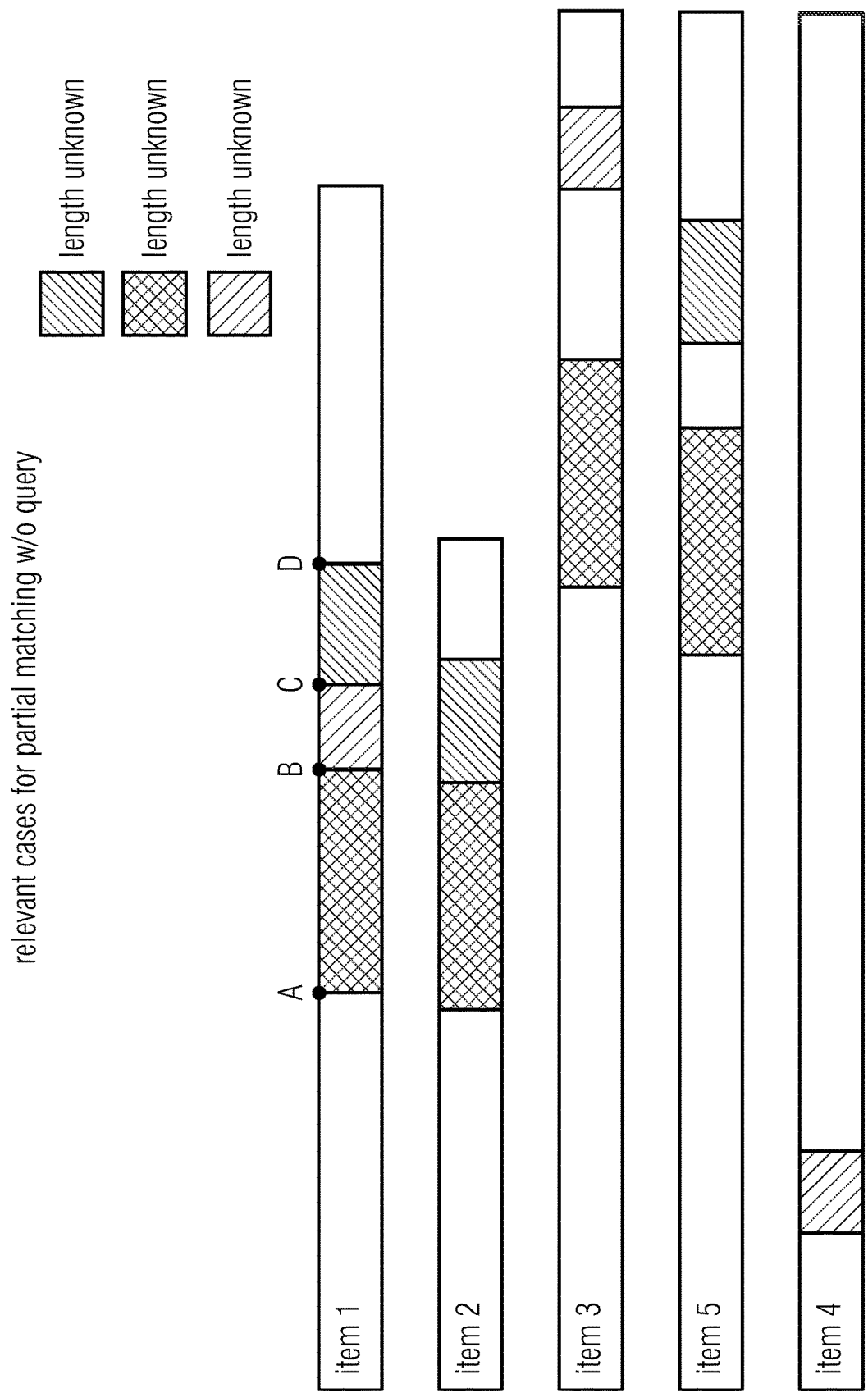
FIG. 6 illustrates relevant cases of the concept of partial matching of a first time varying signal and a second time varying signal, which is used according to the invention.

FIG. 6 illustrates relevant cases of the concept of partial matching of a first time varying signal SG1 and a second time varying signal SG2, which is used according to the invention. In FIG. 6, item 1 is an original item within an item set, and all other items are derivatives of item 1. The goal is to detect and localize all partial matches (item segments with the same pattern indicated by the same shading in FIG. 6) between item 1 and the items derived, which have been created e.g. via Cutting (removal), as represented with item 2, where excerpt of item 1 between points AB and C-D are spliced together and B-C is removed.

Pasting (insertion), as represented with item 3, where new content is inserted between two consecutive portions of item 1, namely A-B and B-C.

Cutting & pasting (replacement), as represented with item 5, where from content excerpt A-D of item 1, B-C is removed and replaced with other content. This case is especially difficult to detect if the amount of content removed is the same as the amount of content inserted, which happens frequently in practice.

Splicing, as represented in items 2-4, where segment(s) of item 1 have been spliced to the new content (i.e., not reused from item 1).

Figure 7:
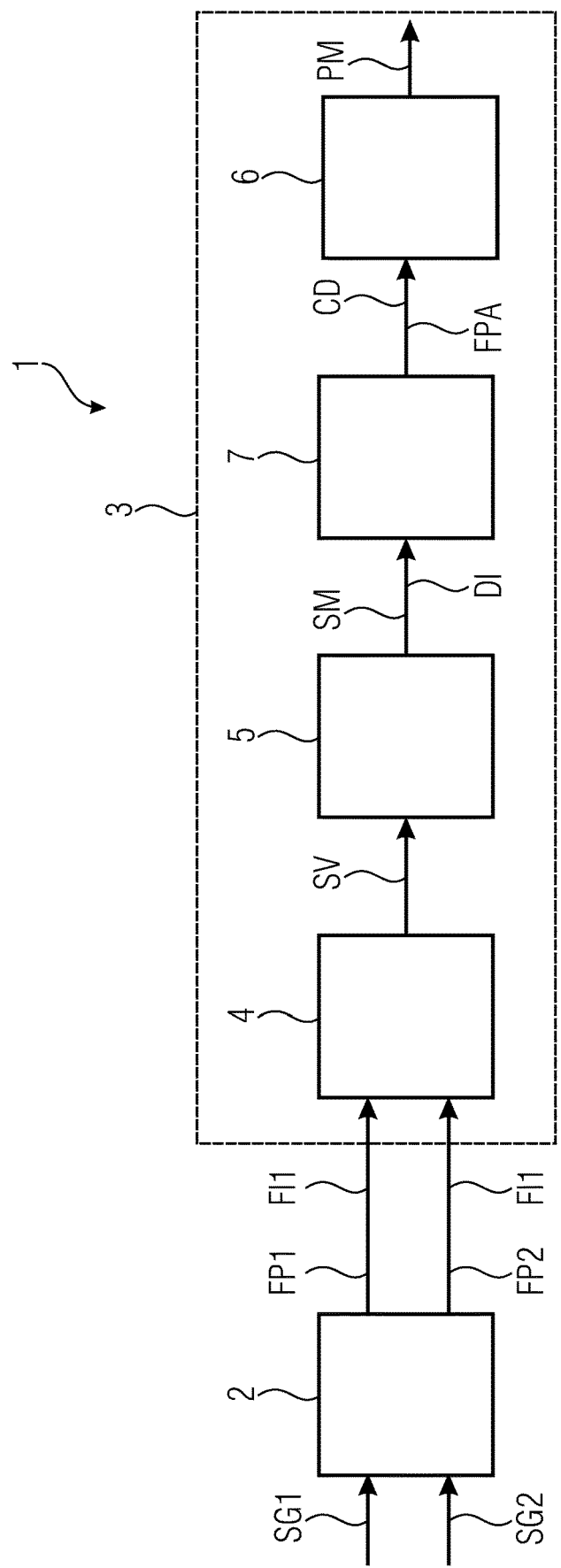
FIG. 7 illustrates a second embodiment of a device for detecting partial matches between a first time varying signal and a second time varying signal according to the invention in a schematic view.

FIG. 7 illustrates a second embodiment of a device 1 for detecting partial matches between a first time varying signal SG1 and a second time varying signal SG2 according to the invention in a schematic view.

According to some embodiments of the invention the matching stage 3 comprises a first pattern search stage 7 configured for searching first patterns FPA within the plurality of diagonals DI, which comprise one or more of the frame matches FM and zero or more frame mismatches FMM being located between two of the frame matches FM of the respective first pattern FPA, wherein a number of consecutive frame mismatches FMM within the respective first pattern FPA does not exceed a threshold for a maximum allowed number of consecutive frame mismatches FMM within the respective first pattern FPA, wherein a length LEF of the respective first pattern FPA from an earliest frame match FM of the respective first pattern FPA to a latest frame match FM of the respective first pattern FPA at least reaches a threshold for a minimum length of the first pattern FPA, wherein the diagonals DI, in which at least one of the first patterns FPA is found, are marked as candidate diagonals CD; and wherein the detection stage 6 is configured for detecting the partial matches PM by evaluating the candidate diagonals CD of the similarity matrix SM.

According to some embodiments of the invention the detection stage 6 is configured in such way that each of the first patterns FPA, in which a ratio between a number of frame matches FM of the respective first pattern FPA and the length LEF of the respective first pattern FPA reaches a threshold for the ratio between the number of frame matches FM of the respective first pattern FPA and the length LEF of the respective first pattern FPA, is detected as being one of the partial matches PM.

Figure 8:
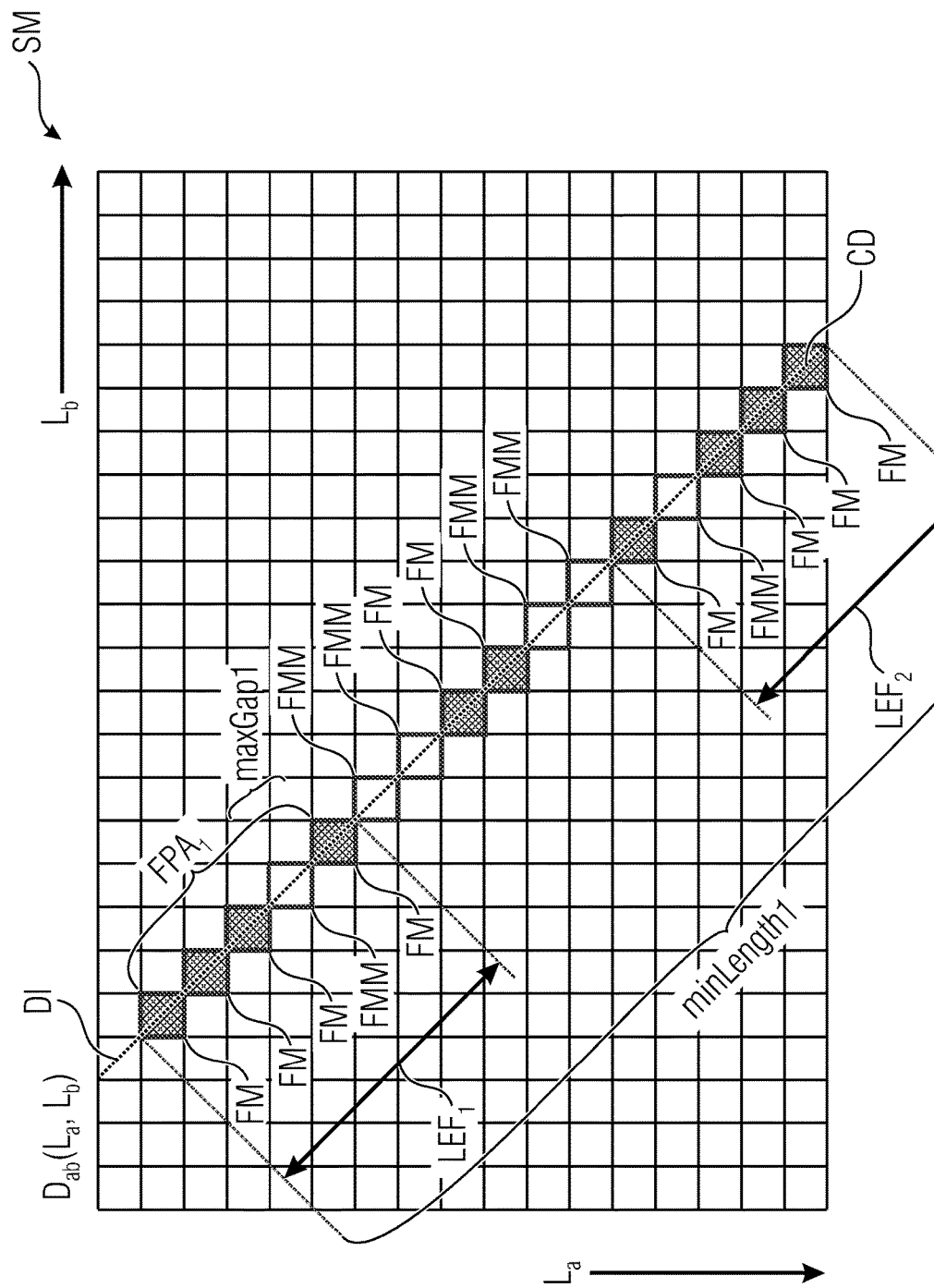
FIG. 8 illustrates an exemplary mode of operation of an embodiment of a first pattern search stage of a device according to the invention in a schematic view.

FIG. 8 illustrates an exemplary mode of operation of an embodiment of a first pattern search stage 7 of a device 1 according to the invention in a schematic view. Diagonal first line patterns FPA may be searched by keeping a track of consecutive frame matches FM in every possible (left to right) diagonal DI in a similarity matrix SM. A threshold (maxGap1) defines the maximum allowed number of non-matching frames FMM on tracked diagonal DI between two frame matches FM, while a further threshold (minLength1) defines the shortest consecutive track that could be marked as candidate diagonal CD and sent for further processing.

Figure 9:
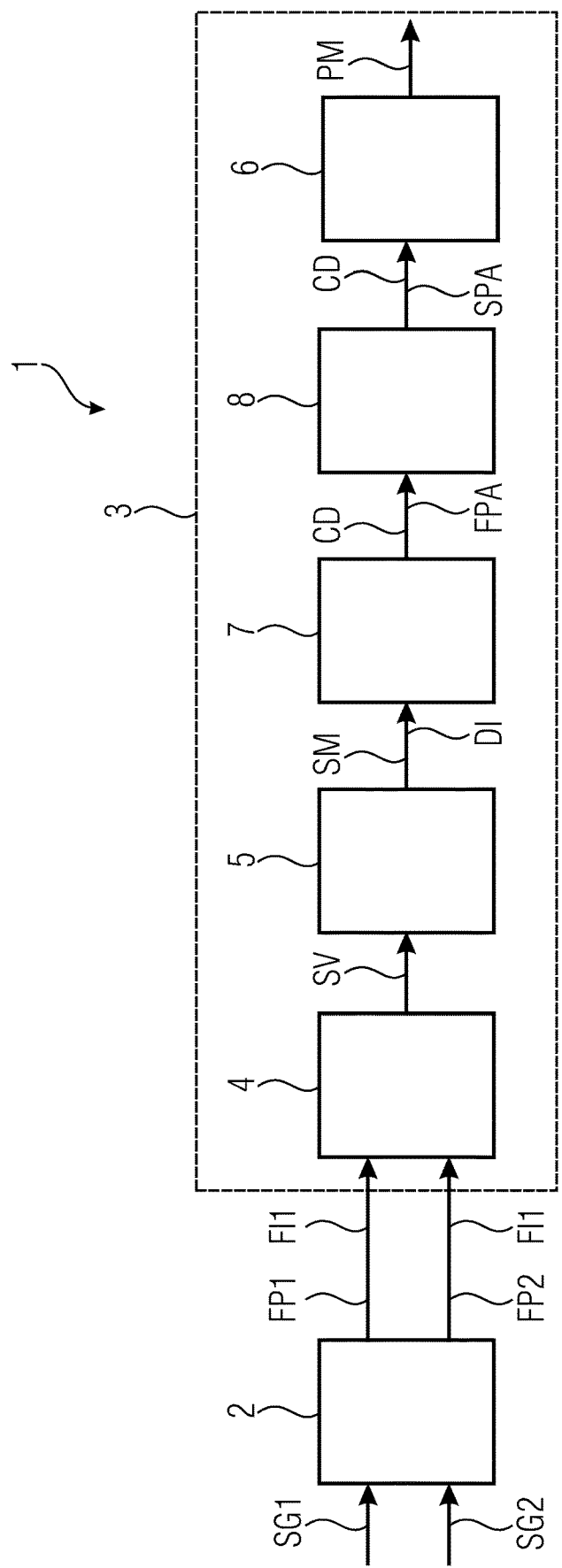
FIG. 9 illustrates a third embodiment of a device for detecting partial matches between a first time varying signal and a second time varying signal according to the invention in a schematic view.

FIG. 9 illustrates a third embodiment of a device 1 for detecting partial matches between a first time varying signal SG1 and a second time varying signal SG2 according to the invention in a schematic view.

According to some embodiments of the invention the matching stage 3 comprises a second pattern search stage 8 configured for searching second patterns SPA within the candidate diagonals CD, which comprise one or more of the first patterns FPA and one or more frame mismatches FMM between two of the first patterns FPA, wherein a number of consecutive frame mismatches FMM between two of the first patterns FPA does not exceed a threshold for a maximum allowed number of consecutive frame mismatches FMM between two of the first patterns FPA, wherein a length LES of the respective second pattern SPA from an earliest frame match FM of the respective second pattern SPA to a latest frame match FM of the respective second pattern SPA at least reaches a threshold for a minimum length of the second pattern SPA; and wherein the detection stage 6 is configured for detecting the partial matches by evaluating the second patterns SPA of the candidate diagonals CI.

According to some embodiments of the invention the detection stage 6 is configured in such way that each of the second patterns SPA, in which a ratio between a number of frame matches FM of the respective second pattern SPA and the length LES of the respective second pattern SPA reaches a threshold for the ratio between the number of frame matches FM of the respective second pattern SPA and the length LES of the respective second pattern SPA, is detected as being one of the partial matches PM.

Figure 10:
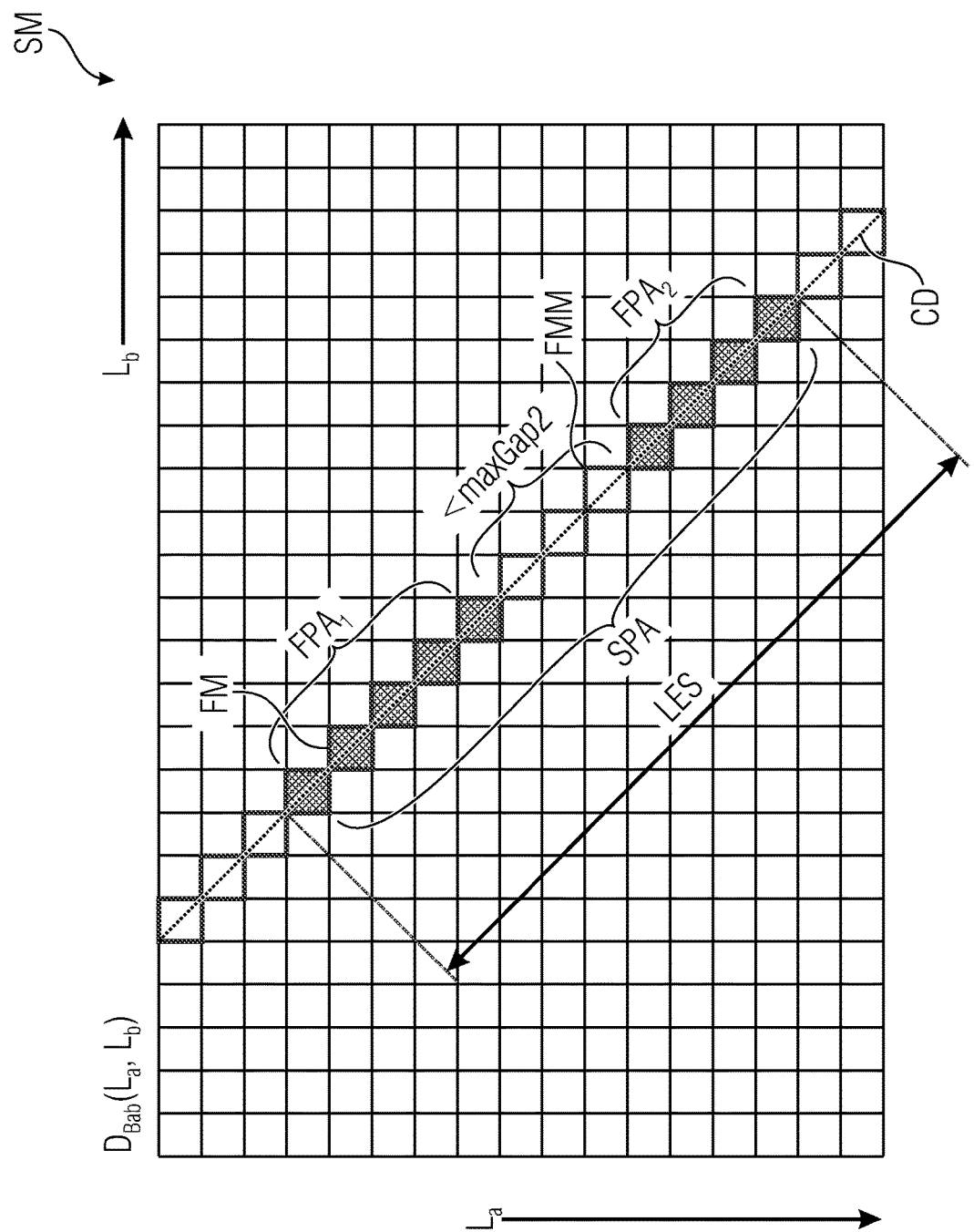
FIG. 10 illustrates an exemplary mode of operation of an embodiment of a second pattern search stage of a device according to the invention in a schematic view.

FIG. 10 illustrates an exemplary mode of operation of an embodiment of a second pattern search stage 8 of a device 1 according to the invention in a schematic view. From all first patterns FPA every two first patterns FPA with the same offset are taken and presented as one consecutive match or as two disconnected matches, based on a parameter selected by the user (maxGap2). FIG. 10 shows binary similarity matrix SM ($D_{Bab}$) with two first patterns FPA that have the same offset (lying on the same candidate diagonal CI) and will be presented as a second pattern SPA since the gap in between (amount of non-matching frames) is lower than defined threshold maxGap2.

A decision may be made based on two threshold parameters if the second pattern SPA is a partial match PM, wherein (minLength2) is the minimal allowed length of diagonal and (density) is the density of the one consecutive match (number of matching frames over total length of match). In FIG. 10 length of diagonal is 12 frames, while its density is 0.75.

Figure 11:
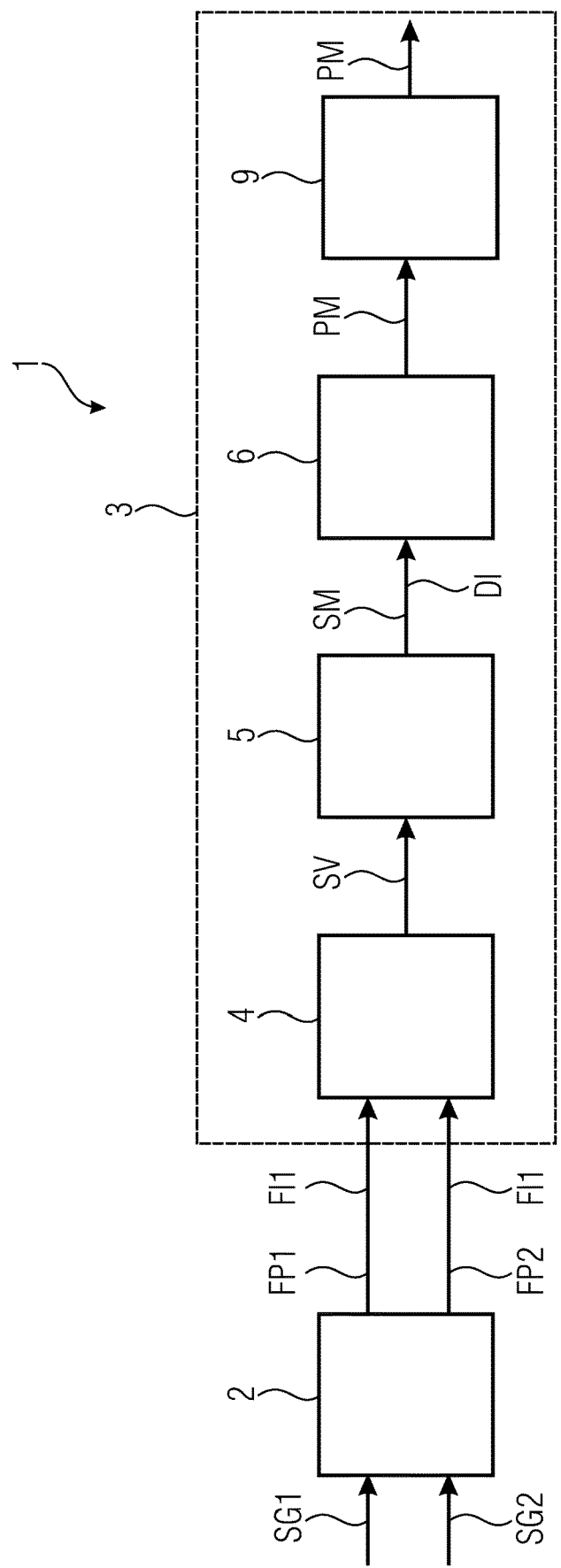
FIG. 11 illustrates a fourth embodiment of a device for detecting partial matches between a first time varying signal and a second time varying signal according to the invention in a schematic view.

FIG. 11 illustrates a fourth embodiment of a device 1 for detecting partial matches between a first time varying signal SG1 and a second time varying signal SG2 according to the invention in a schematic view.

According to some embodiments of the invention the matching stage 3 comprises a clean-up stage 9 configured for receiving at least some of the partial matches PM detected by the detection stage 6 and for determining a longest partial match LPM of the partial matches PM, wherein the longest partial match LPM of the received partial matches PM is a main diagonal DIR of a rectangular portion RP of the similarity matrix SM, wherein a further partial match FPM of the received partial matches PM, which extends at least partially into the rectangular portion RP of the similarity matrix SM is discarded, unless following conditions are met:

an absolute value of a horizontal distance HD1 between an earliest frame match FM of the longest received partial match LPM and an earliest frame match FM of the further received partial match FPM exceeds a distance threshold;

an absolute value of a vertical distance VD1 between the earliest frame match FM of the longest received partial match PM and the earliest frame match of the other received partial match PM exceeds the distance threshold;

an absolute value of a horizontal distance HD2 between a latest frame match FM of the longest received partial match PM and a latest frame match FM of the further received partial match PM exceeds a distance threshold; and an absolute value of a vertical distance VD2 between the latest frame match FM of the longest received partial match PM and the latest frame match FM of the further received partial match PM exceeds the distance threshold; and a row index of the latest frame match FM of the further received partial match FPM is greater than a row index of the latest frame match FM of the longest received partial match LPM, in case that a column index of the latest frame match FM of the further received partial match FPM is greater than a column index of the latest frame match FM of the longest received partial match LPM;

wherein the not discarded partial matches PM are outputted.

Figure 12:
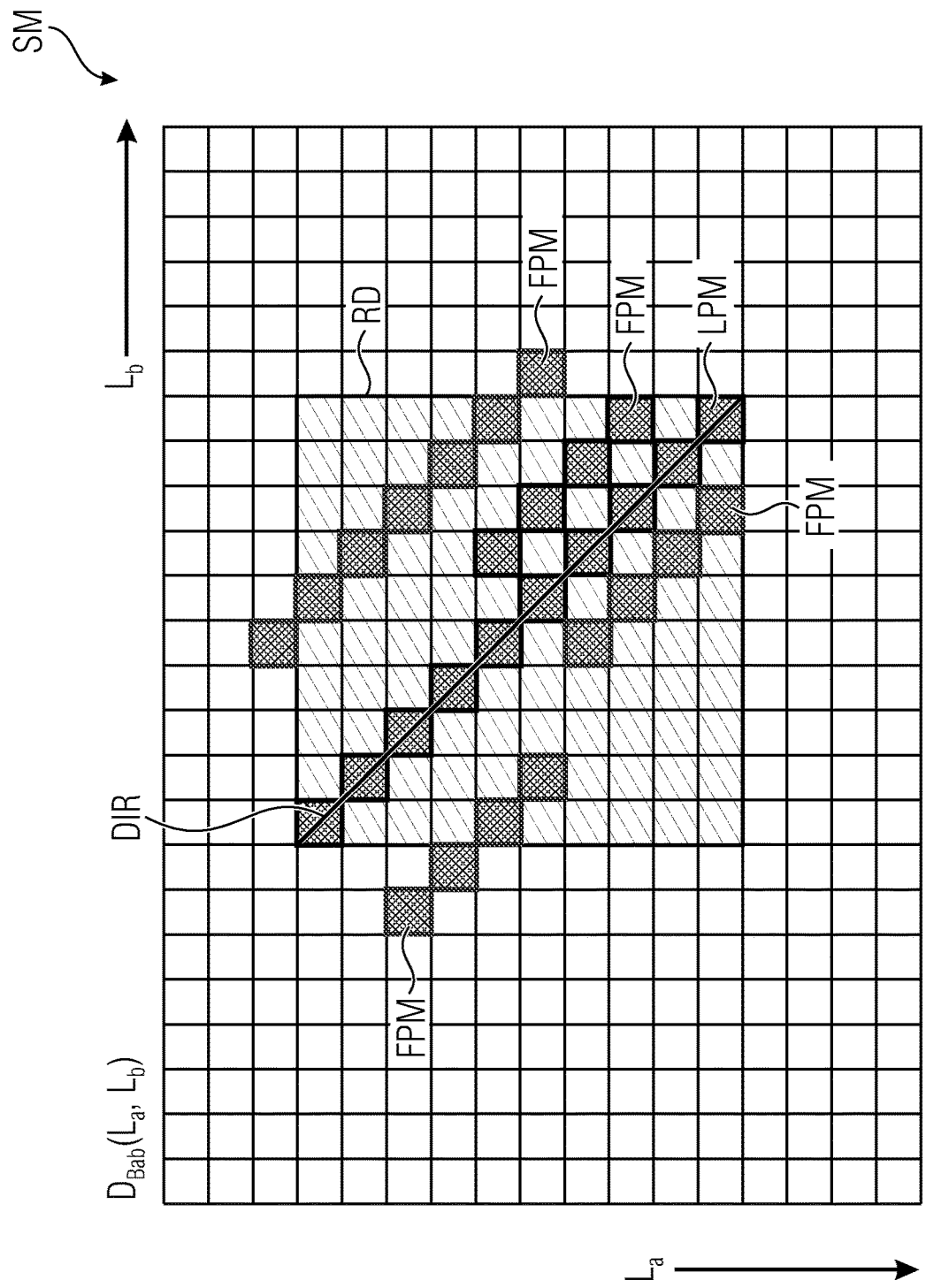
FIG. 12 illustrates an exemplary mode of operation of an embodiment of a clean-up stage of a device according to the invention in a schematic view.

FIG. 12 illustrates an exemplary mode of operation of an embodiment of a clean-up stage 9 of a device 1 according to the invention in a schematic view. The longest partial match LPM marked in a previous step is selected, and all the other partial matches FPM that match the same content from the perspective of both signals SG1 and SG2 may be discarded (dominated diagonals) using a parameter that could be tuned from user perspective in case of application scenarios where the goal is to detect repeating content within one item.

In FIG. 12 a longest partial match LPM and a rectangle RP around it as its "restricted" area are shown. That means that every further partial match FPM going through that area will be discarded, which applies for all further partial match FPM in FIG. 12.

Figure 13:
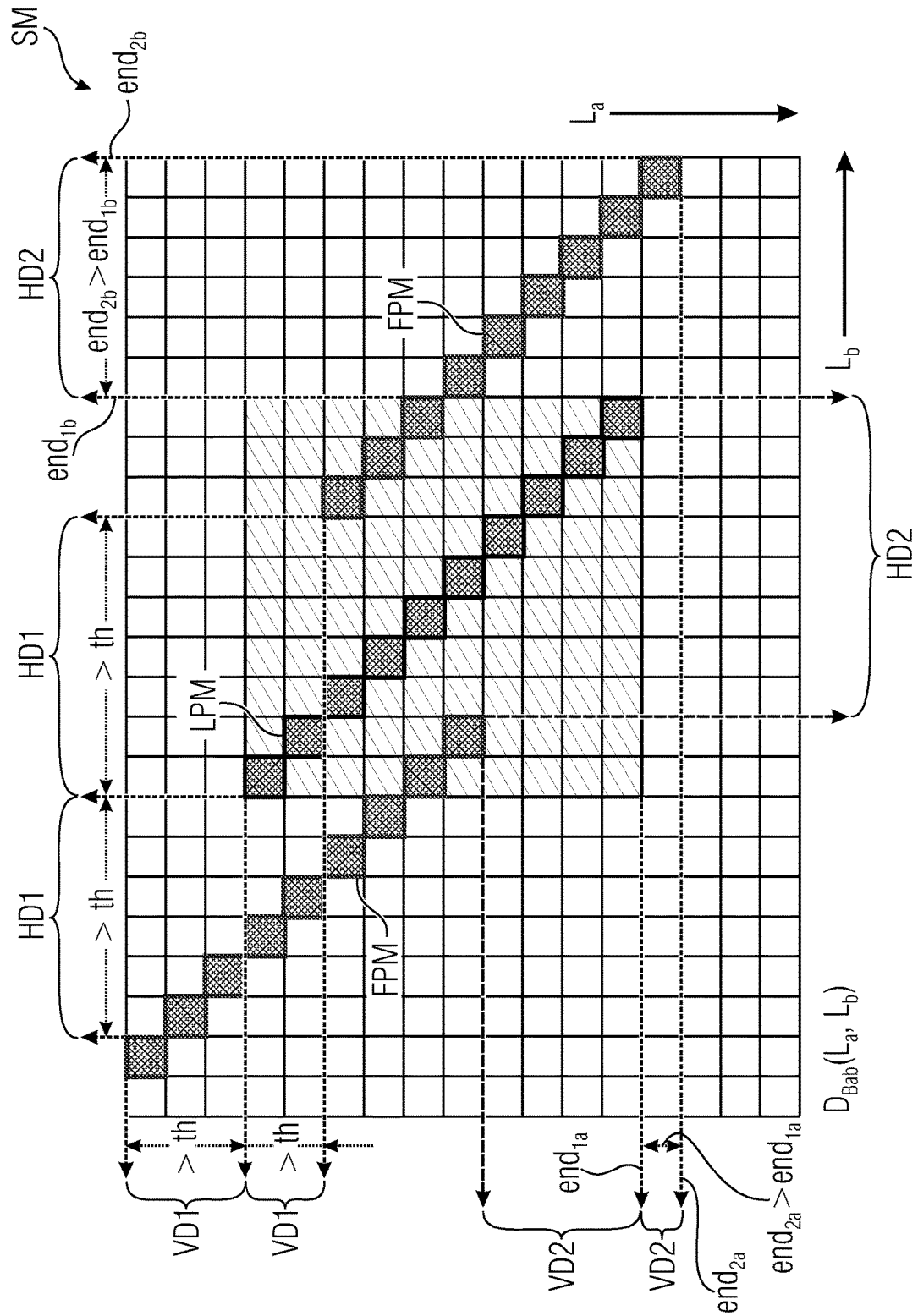
FIG. 13 illustrates an exemplary mode of operation of an embodiment of a clean-up stage of a device according to the invention in a schematic view.

FIG. 13 illustrates an exemplary mode of operation of an embodiment of a clean-up stage 9 of a device 1 according to the invention in a schematic view. Although the further partial matches FPM in FIG. 13 are crossing the "restricted" area RP of the longest partial match LPM they won't be discarded since they fulfill several conditions: Their start is lying more than a threshold (th) away from the start of longest partial match LPM and this should be true from the perspective of both signals SG1 and SG2. In this case the threshold (th) is a user defined threshold. Moreover, in cases when the further partial match FPM lies on the right from longest partial match LPM its ending point should be greater than ending point of the longest partial match LPM (here again from the perspective of both audio files).

Figure 14:
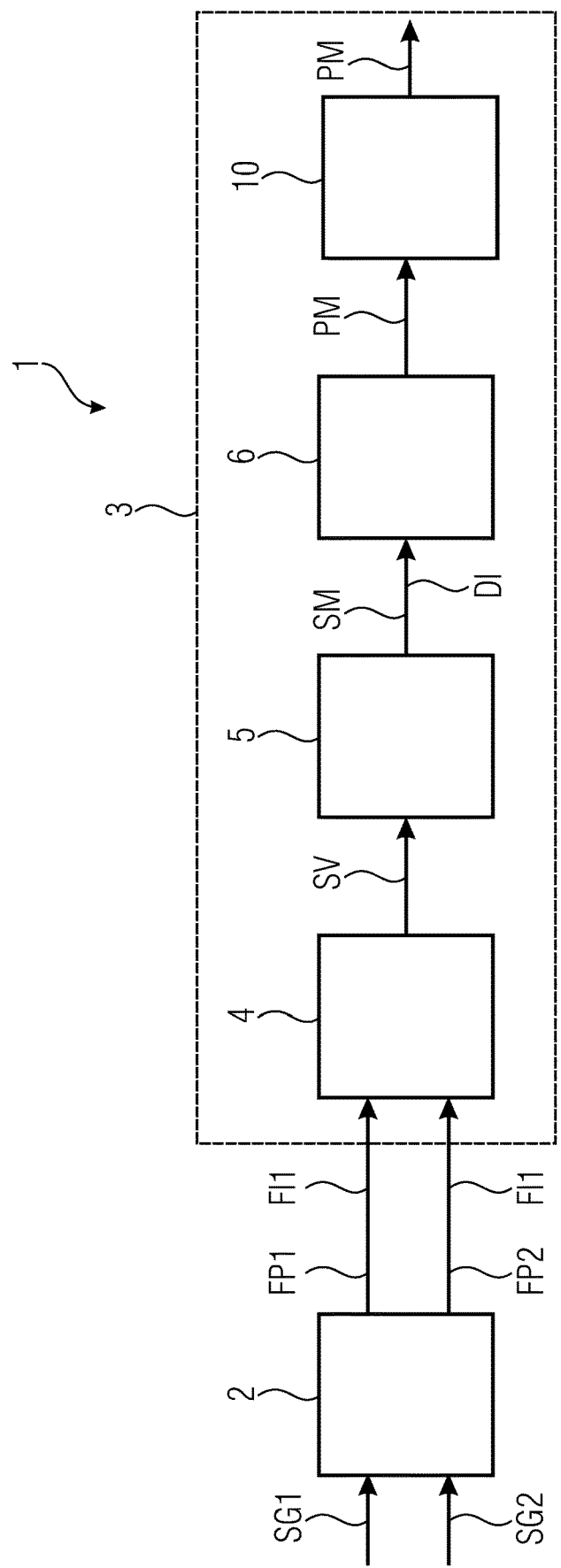
FIG. 14 illustrates a fifth embodiment of a device for detecting partial matches between a first time varying signal and a second time varying signal according to the invention in a schematic view.

FIG. 14 illustrates a fifth embodiment of a device 1 for detecting partial matches between a first time varying signal SG1 and a second time varying signal SG2 according to the invention in a schematic view.

According to some embodiments of the invention the matching stage 3 comprises a noise and silence processing stage 10 configured for receiving at least some of the partial matches PM detected by the detection stage 6 and for discarding one of the received partial matches PM, in case that the one of the received partial matches PM is wrongly detected due to noisy or silent portions in the first time varying signal SG1 and the second time varying signal SG, wherein the one of the received partial matches PM is a main diagonal of a further rectangular portion of the similarity matrix SM, wherein a noise ratio between a number of the frame matches FM in the further rectangular portion of the similarity matrix SM excluding the frame matches FM of the main diagonal of the further rectangular portion of the similarity matrix SM and a number of the similarity values SV in the further rectangular portion of the similarity matrix SM excluding the similarity values SV of the main diagonal of the further rectangular portion of the similarity matrix SM is calculated, wherein the one of the received partial matches PM is discarded depending on a threshold for the noise ratio, wherein the not discarded partial matches PM are outputted.

These features may avoid false partial matches PM due to noise and silence. These types of partial matches PM generate typical patterns that can be recognized and excluded from the matching results, which is very useful in cases when the signals SG1 and SG2 are really short (for example shorter than 2 s). In order to detect partial matches PM of silence and noise examine the previously called "restricted" area around one partial match PM may be examined. In this area an amount of matching frames FM excluding the main diagonal may be calculated. When this number is divided with a total number of positions in the "restricted" area excluding the main diagonal a noise score may be achieved. This noise score will then be compared with a user defined threshold (noiseLevel) in order to make a decision if this partial match PM is a true partial match or if it should be avoided.

Figure 15:
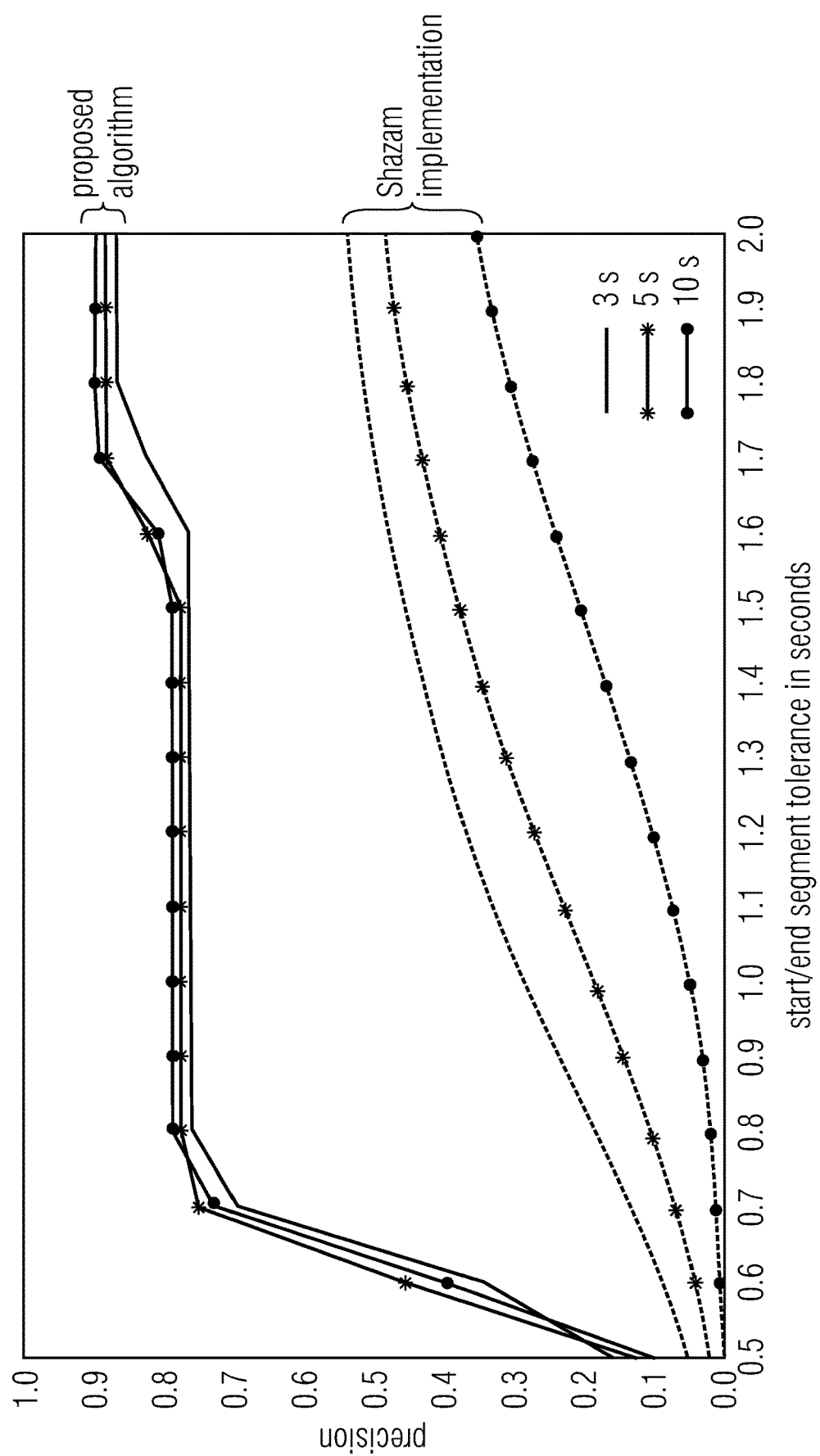
FIG. 15 illustrates a comparison between exemplary results achieved by partial matching in contrast to classic matching.
Figure 16:
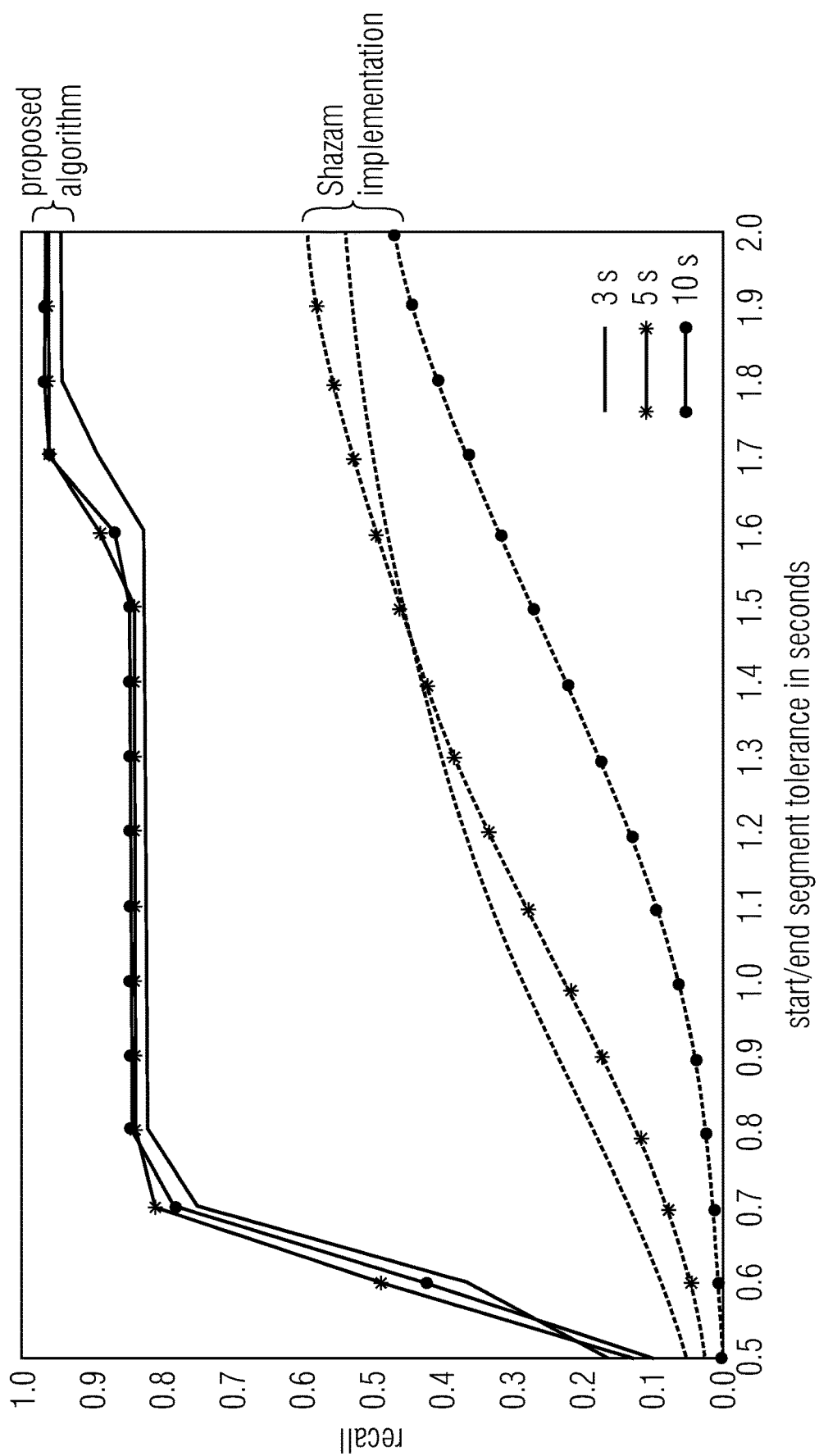
FIG. 16 illustrates a comparison between exemplary results achieved by partial matching in contrast to classic matching.

FIGS. 15 and 16 illustrate a comparison between exemplary results achieved by partial matching in contrast to classic matching.

An evaluation was performed using the following datasets:

A reference dataset with content from radio and TV programs including speech and music (≈50 hours of material in total).

A non-reference dataset.

A test set which has 6000 test files created by using material from the reference dataset, and non-reference material for some types of test files.

For the creation of the test set, the goal was to recreate all possible cases of derived items as depicted in FIG. 6. Hence, the following types of editing were applied on excerpts of the reference audio content:

Cutting (removal): one continuous excerpt from a reference file where 2 seconds are cut from the middle.

Pasting (insertion): one continuous excerpt from a reference file where 2 seconds of non-reference content are pasted in the middle.

Cut and paste (replacement): one continuous excerpt from a reference file where 2 seconds are cut from the middle and 2 seconds of non-reference content are pasted instead.

Splicing: a random number (2 to 5) of audio excerpts from the same or different reference files were spliced together.

The targeted lengths of the audio files excerpts after one of the editing operations are 10, 5 and 3 seconds. The total number of created test files is 500 for every length of every type, resulting in 500*4*3=6000 files. For the cutting, pasting and cut and paste editing types, the content excerpt length of 2 seconds is selected arbitrarily. Changing this parameter is not influencing the performance of the algorithm, as long as it is ≥maxGap2. After editing the files from the test set, every test file underwent up to two randomly selected transformations of encoding with MP3{128,192, 320 kbit/s} or AAC{128,192,320 kbit/s} and volume change between 0.5 up to the maximum possible before clipping occurred. This set of transformations has been selected considering segment matching applications that do not require robustness against heavy degradation of content quality.

Every test file was matched against all the other files in the reference dataset, and all the reported segment matches were then evaluated and classified as: True Positives or False Positives. If no match was retrieved for the segment of a test file with a match within the reference dataset, the number of False Negatives was increased by one. True Positives, False Positives and False Negatives are defined as follows:

True Positives are retrieved matching segments that have correct start and end location within the test file (with defined tolerance $\tau$) and are found in the correct reference audio file also with the correct start and end location.

False Positives are the retrieved matching segments that do not fulfill all mentioned conditions for it to be a True Positive, namely: correct location within a test file, correct reference file and correct location within a reference file.

False Negatives are not retrieved matching segments that according to ground truth have their matches in reference dataset.

For the allowed tolerance values of start/end positions of retrieved matches $\tau \in \{\pm 0.5, 0.6, 0.7, 0.8, \ldots 2\}$ in seconds, recall and precision were calculated accordingly.

In known technology, an approach capable of adequately addressing the target application scenarios does not yet exist. Therefore, a popular algorithm was selected that offers the closest solution to the problem addressed and temporal alignment, which is described in [1], was included using the Python implementation [13] by Dan Ellis in order to compare its results for the given setup with the inventive approach.

In order to use the Ellis's Python implementation for our purposes, the supported option for reporting the position of every match was used, asking for 5 best matches to be returned, as this is the maximum number of matching segments that one would expect. The supported option for more precise match counting was also used. For the purpose of so-called classic matching, these options are less relevant, since the goal is usually only to detect one reference file from the database, based on one best match. Hence, the algorithm may use, as an input from the user, a number of best matches to be retrieved. This information is, by definition, unknown for our target applications, but for the sake of evaluation, it is provided here.

FIGS. 15 and 16 show the results of the proposed algorithm, which are shown in solid lines, and Ellis's Python implementation of Wang's algorithm [1], which are shown in dashed lines. The results were obtained using the evaluation metrics and the datasets described above. The proposed algorithm has achieved significantly better results. For an allowed start/end segment tolerance of ±1.7 s, the proposed algorithm achieved an average precision of 0.88 and an average recall of 0.94, while Dan Ellis's Shazam implementation at the same tolerance achieved 0.42 average precision and 0.47 average recall.

The most difficult case for [13] to detect was the cut-paste test files. Only for this type of test files, precision and recall at start/end tolerance of ±1.7 s were both 0.23. If this type of test files was excluded, precision and recall for the same start/end tolerance raised to 0.5 and 0.56.

According to some embodiments of the invention the actual segment matching, i.e. comparison of two fingerprints after extraction, may be performed as follows:

1. The fingerprint pairs FP1 and FP2 may be compared using an appropriate distance measure (i.e. appropriate to the fingerprint used, e.g. Euclidian distance in the case of the proposed fingerprint FP1, FP2). The comparison of the first fingerprint FP1 with the second fingerprint FP2 results in a similarity matrix SM ($D_{ab}$ ($L_a$, $L_b$)), where $L_a$ is the amount of feature vectors FV1 from the first fingerprint FP1 and $L_b$ is the number of feature vectors FV2 from the second fingerprint FP2 In both fingerprints, the order of the feature vectors respects the temporal order of the corresponding time frames.
2. After applying a threshold τ to the similarity matrix SM ($D_{ab}$), a binary similarity matrix SM ($D_{Bab}$) is obtained which represents the matching between two fingerprints FP1 and FP2.
3. Retrieval of matches: In the binary matching matrix $D_{Bab}$, we search for diagonals of 1's, and based on the diagonal position within this matching matrix, we retrieve start and end positions of the respective matching segments within $F_a$ and $F_b$. We propose the following approach, which is optimized for the requirements outlined above, providing good detection and localization performance at low computational cost:
   a. Candidate diagonals: Diagonal first line patterns FPA may be searched by keeping a track of consecutive frame matches FM in every possible (left to right) diagonal DI in a similarity matrix SM. A threshold (maxGap1) defines the maximum allowed number of non-matching frames FMM on tracked diagonal between two matches FM, while threshold (minLength1) defines the shortest consecutive track that could be marked as candidate diagonal CD and sent for further processing.
   b. Join diagonals: From all first patterns FPA every two first patterns FPA with the same offset are taken and presented as one consecutive match or as two disconnected matches, based on a parameter selected by the user (maxGap2). FIG. 10 shows binary similarity matrix SM ($D_{Bab}$) with two first patterns FPA that have the same offset (lying on the same candidate diagonal CI) and will be presented as a second pattern SPA since the gap in between (amount of non-matching frames) is lower than defined threshold maxGap2.
   c. Match decision: A decision may be made based on two threshold parameters if the second pattern SPA is a partial match PM, wherein (minLength2) is the minimal allowed length of diagonal and (density) is the density of the one consecutive match (number of matching frames over total length of match). In FIG. 10 length of diagonal is 12 frames, while its density is 0.75.
   d. Clean multiple line candidates: The longest partial match PM marked in a previous step is selected, and all the other partial matches PM that match the same content from the perspective of both signals SG1 and SG2 may be discarded (dominated diagonals) using a parameter that could be tuned from user perspective in case of application scenarios where the goal is to detect repeating content within one item. In FIG. 12 a longest partial match LPM and a rectangle RP around it as its "restricted" area are shown. That means that every further partial match FPM going through that area will be discarded, which applies for all further partial match FPM in FIG. 12. Although the further partial matches FPM in FIG. 13 are crossing the "restricted" area RP of the longest partial match LPM they won't be discarded since they fulfill several conditions: Their start is lying more than a threshold (th) away from the start of longest partial match LPM and this should be true from the perspective of both signals SG1 and SG2. In this case the threshold (th) is a user defined threshold. Moreover, in cases when the further partial match FPM lies on the right from longest partial match LPM its ending point should be greater than ending point of the longest partial match LPM (here again from the perspective of both audio files).
   e. Noise and silence flagging: This step may avoid false partial matches PM due to noise and silence. These types of partial matches PM generate typical patterns that can be recognized and excluded from the matching results, which is very useful in cases when the signals SG1 and SG2 are really short (for example shorter than 2 s). In order to detect partial matches PM of silence and noise examine the previously called "restricted" area around one partial match PM may be examined. In this area an amount of matching frames FM excluding the main diagonal may be calculated. When this number is divided with a total number of positions in the "restricted" area excluding the main diagonal a noise score may be achieved. This noise score will then be compared with a user defined threshold (noiseLevel) in order to make a decision if this partial match PM is a true partial match or if it should be avoided.

Step 3 can also be summarized by the following flow description:

Input: Binary matrix $D_{Bab}$
Output: set of matching results {matches}
Step 1: ShortDiagonals(a,b)=getShortDiagonals($D_{Bab}$, minLength1, maxGap1)
Step 2: LongDiagonals(a,b)=getLongDiagonals(ShortDiagonals(a,b), minLength2, maxGap2, density)
Step 3: CleanDiagonals(a,b)=removeDominatedDiagonal (Longdiagonals(a,b), threshold)
Step 4: Matches(a,bq,z)=trans formToMatch(CandidateMatches(a,b))
Step 5: CandidateMatches(a,b)=removeNoisyAndSilentMatches(CleanDiagonals(a,b), noiseLevel)

Depending on the features (fingerprints) used step 3 and step 5 from the above can be optional. And of course, in order to analyze (large) datasets, the described extraction and pairwise comparison steps are performed for all relevant pairs in a set.

Important further notes:
1. The proposed detection of diagonals, while providing good performance at low computational cost, is unable to deal with time-stretching and non-equidistant fingerprints. While this is OK for most of the outlined use cases, diagonal detection can also be implemented using other state-of-the-art approaches e.g. from the music analysis domain (for similarity/self-similarity detection) to support such requirements. A survey of state-of-the-art methods for computational music structure analysis can be found in [2], where some of the approaches that search for diagonal stripes parallel to main diagonal in self-distance matrix (SDM) are [3], [4] and [5].
2. The proposed segment matching above can also be applied to other data, including video etc. can be represented with frame-wise fingerprints; for instance, it has been successfully tested for the matching of extracted ENF data for forensics purposes [6].
3. The proposed segment matching is, in principle, open to different fingerprints formats. For instance, we did not only use the proposed fingerprint format that is optimized for small footprint size and fast processing, we also tested the approach with the fingerprint used by SMT (Semantic Music Technology group from Fraunhofer IDMT), which resulted in significantly improved robustness against noise (at the cost of increased computational cost). The idea is to be able to use different fingerprint formats, depending on the respective application requirements.
4. The robustness of the proposed segment matching against noise (which can be e.g. other speech or music material "in the mix") can be further increased: In cases in which segment matching does not detect all but only some partial matches due to the fact that e.g. background music that is to be detected is covered by dominant speech, and only audible in silent passages, this will show as a gap between diagonals on the same straight; such gaps can be detected, and then several approaches can be applied, also in combination:
    Check the line through the detected diagonals for further matches between and beyond the detected diagonals, using a more sensitive setting for detection; if further partial diagonals on the line are detected, repeat the procedure until a minimum threshold is reached or no further gaps exist.
    Compare the detected segments using classic robust matching or correlation-based approaches.
    Because the procedure is costly, it can make sense to estimate whether the gap detected could be due to a "mix" case by subtracting one signal from the other and analyze the remaining difference signal.
5. In order to speed up the detection process for large datasets, Locality Sensitive Hashing (LSH) can be applied, then to be complemented with our approach for the localization.
6. Parallel processing and GPU usage can be applied to improve efficiency for the described approach.

In addition to the above, for some of the use cases, the efficiency of the proposed solution can (optionally) be further improved by combining it with
    editing detection, in the sense that editing detection approaches, e.g. audio editing detection results from encoding analysis, stable tones and ENF analysis or microphone analysis, can be used as likely candidates for segmentation and reuse, thereby improving efficiency of the approach
    phylogeny analysis, in the sense that the processing history of detected segments can be further analyzed to determine the original "root" item and derived items, which is key for duplicate removal
    classic matching, in the sense that for some use cases, after detecting and accurately localizing previously unknown partial matches, classic matching can then be used for a quick search for further occurrences An important issue for the proposed approach is scalability and security with respect to analysis. Several points are key to achieve this:
    As for other matching approaches, extraction and matching can be decoupled, which means that it is possible to extract fingerprints of content providers on-premise, then transferring the extracted fingerprints for analysis to an untrusted domain. This can also be applied to collaborative scenarios, where many content providers have an interest to understand where partial overlaps exist (e.g. to align and clean up metadata), but security and traffic costs are to be considered.
    Beyond the extraction process, the matching process can also be distributed: The process is based on pairwise comparisons, which allows distribution of the matching process for larger datasets and reuse of existing matching results if new items are added to a dataset (which is often the case): For a set with n items analyzed, which may use (n^2−n)/2 pairwise comparisons to be completed, for the addition of a new item, only n pairwise comparisons are needed to update the model—all existing comparison results can be reused. This makes it possible to merge results from decentralized analysis.
    Based on the pairwise comparison results, the system can support higher-level user queries by applying a procedure that creates classes for matching segments: For any detected match that is overlapping with an already detected match, it is added to that group (if it overlaps completely), or splits the existing groups in 2 or 3 new groups and joins one of them (if it overlaps partially). This makes it possible to quickly query the system for reused/redundant material.

Depending on certain implementation requirements, embodiments of the inventive device and system can be implemented in hardware and/or in software. The implementation can be performed using a digital storage medium, for example a floppy disk, a DVD, a Blu-ray Disc, a CD, a ROM, a PROM, an EPROM, an EEPROM or a FLASH memory, having electronically readable control signals stored thereon, which cooperate (or are capable of cooperating) with a programmable computer system such that one or more or all of the functionalities of the inventive device or system is performed.

In some embodiments, a programmable logic device (for example a field programmable gate array) may be used to perform one or more or all of the functionalities of the devices and systems described herein. In some embodiments, a field programmable gate array may cooperate with a microprocessor in order to perform one or more or all of the functionalities of the devices and systems described herein.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the inventive method can be implemented using an apparatus comprising hardware and/or software. The implementation can be performed using a digital storage medium, for example a floppy disk, a DVD, a Blu-ray Disc, a CD, a ROM, a PROM, an EPROM, an EEPROM or a FLASH memory, having electronically readable control signals stored thereon, which cooperate (or are capable of cooperating) with a programmable computer system such that the respective method is performed.

Depending on certain implementation requirements, embodiments of the inventive method can be implemented using an apparatus comprising hardware and/or software.

Some or all of the method steps may be executed by (or using) a hardware apparatus, like a microprocessor, a programmable computer or an electronic circuit. Some one or more of the most important method steps may be executed by such an apparatus.

Some embodiments according to the invention comprise a data carrier having electronically readable control signals, which are capable of cooperating with a programmable computer system such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, which is stored on a machine readable carrier or a non-transitory storage medium.

A further embodiment comprises a processing means, for example a computer, or a programmable logic device, in particular a processor comprising hardware, configured or adapted to perform one of the methods described herein.

A further embodiment comprises a computer having installed thereon the computer program for performing one of the methods described herein.

Generally, the methods are advantageously performed by any apparatus comprising hardware and or software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] Wang, A.: An industrial-strength audio search algorithm. In Proc. of International Conference on Music Information Retrieval (ISMIR), Baltimore, Maryland, USA, October, 2003.
[2] Paulus, Jouni; Müller, Meinard; Klapuri, Anssi: Audio-based music structure analysis. In: Proceedings of the 11th International Society for Music Information Retrieval Conference (ISMIR). ISMIR. Utrecht, Netherlands, 9-13 August. Utrecht, Netherlands, pp. 625-636, 2010.
[3] Goto, M.: A chorus-section detecting method for musical audio signals. In: Proc. of IEEE International Conference on Acoustics, Speech, and Signal Processing, pages 437-440, Hong Kong, 2003.
[4] Shiu, Y.; Jeong, H.; Kuo, C.-C. J.: Similar segment detection for music structure analysis via Viterbi algorithm. In: Proc. of IEEE International Conference on Multimedia and Expo, pages 789-792, Toronto, Ont., Canada, July 2006.
[5] Rhodes, C.; Casey M.: Algorithms for determining and labelling approximate hierarchical self-similarity. In: Proc. of 8th International Conference on Music Information Retrieval, pages 41-46, Vienna, Austria, September 2007.
[6] Grigoras, C.: Digital audio recording analysis—the electric network frequency criterion. In: International Journal of Speech Language and the Law, vol. 12, no. 1, pp. 63-76, 2005.
[7] Eric Allamanche, Jurgen Herre, Oliver Hellmuth, and Bernhard Frba: Content-based identification of audio material using mpeg-7 low level description. In: Proc. Int. Symposium on Music Information Retrieval (ISMIR), 2001.
[8] Xavier Anguera, Antonio Garzon, and Tomasz Adamek: Mask: Robust local features for audio fingerprinting. In: ICME. IEEE Computer Society, 2012.
[9] Igor Bisio, Alessandro Delfino, Fabio Lavagetto, and Mario Marchese: A television channel real-time detector using smartphones. In: IEEE Transactions on Mobile Computing, vol. 99 (PrePrints), p. 1, 2013.
[10] Pedro Cano, Eloi Baffle, Ton Kalker, and Jaap Haitsma: A review of audio fingerprinting. In: Journal of VLSI signal processing systems for signal, image and video technology, 41(3), pp. 271-284, 2005.
[11] Vijay Chandrasekhar, Matt Sharifi, and David A. Ross: Survey and evaluation of audio fingerprinting schemes for mobile query-by-example applications. In: ISMIR, 2011.
[12] Michele Covell and Shumeet Baluja: Known-audio detection using waveprint: Spectrogram fingerprinting by wavelet hashing. In: Proceedings of the IEEE International Conference on Acoustics, Speech, and Signal Processing, ICASSP, 2007.
[13] Dan Ellis. audfprint. https://github.com/dpwe/audfprint, 2014.
[14] Martin A. Fischler and Robert C. Bolles: Random sample consensus: A paradigm for model fitting with applications to image analysis and automated cartography. Commun. ACM, 1981.
[15] Emilia Gomez, Pedro Cano, Leandro de C. T. Gomes, Eloi Batlle, and Madeleine Bonnet: Mixed watermarking-fingerprinting approach for integrity verification of audio recordings. In: Proceedings of the International Telecommunications Symposium, 2002.
[16] Jaap Haitsma and Ton Kalker: A highly robust audio fingerprinting system. In: ISMIR, 2002.
[17] Maguelonne Héritier, Vishwa Gupta, Langis Gagnon, Gilles Boulianne, and Patrick Cardinal Samuel Foucher: Crim s content-based copy detection system for trecvid. 2009.
[18] Hervé Jégou, Jonathan Delhumeau, Jiangbo Yuan, Guillaume Gravier, and Patrick Gros: BABAZ: A large scale audio search system for video copy detection. In: International Conference on Acoustics, Speech and Signal Processing, ICASSP, 2012.
[19] Yan Ke, Derek Hoiem, and Rahul Sukthankar: Computer vision for music identification. In: 2005 IEEE Computer Society Conference on Computer Vision and Pattern Recognition (CVPR'05), 2005.
[20] Milica Maksimovic, Luca Cuccovillo, and Patrick Aichroth: Phylogeny analysis for MP3 and AAC coding transformations. In: ICME, 2017.
[21] Mani Malekesmaeili and Rabab K. Ward: A novel local audio fingerprinting algorithm. In: 14th IEEE International Workshop on Multimedia Signal Processing, MMSP, 2012.
[22] Mehmet Kivan Mihak and Ramarathnam Venkatesan: A perceptual audio hashing algorithm: A tool for robust audio identification and information hiding. In: Information Hiding, 2001.
[23] Chahid Ouali, Pierre Dumouchel, and Vishwa Gupta: A robust audio fingerprinting method for content-based copy detection. In: CBMI. IEEE, 2014.
[24] Chahid Ouali, Pierre Dumouchel, and Vishwa Gupta: Fast audio fingerprinting system using GPU and a clustering-based technique. In: IEEE/ACM Trans. Audio, Speech & Language Processing, 2016.
[25] Reinhard Sonnleitner and Gerhard Widmer: Robust quad-based audio fingerprinting. In: IEEE/ACM Trans. Audio, Speech & Language Processing, 2016.
[21] Trec video retrieval evaluation: Trecvid. https://www-nlpir.nist.gov/projects/trecvid/.

The invention claimed is:

1. A device for detecting partial matches between a first time varying signal and a second time varying signal, wherein the first time varying signal comprises a plurality of first portions over time and the second time varying signal comprises a plurality of second portions over time, wherein a partial match is detected if one of the first portions corresponds to one of the second portions, the device comprising:
a fingerprint extraction stage configured for extracting a first fingerprint from the first time varying signal and for extracting a second fingerprint from the second time varying signal, wherein a plurality of first time frames is extracted from the first time varying signal for the first fingerprint, wherein a plurality of second time frames is extracted from the second time varying signal for the second fingerprint, wherein the first fingerprint comprises for each of the first time frames a feature information corresponding to one or more characteristic features in the first time varying signal, which are related to the respective first time frame, and wherein the second fingerprint comprises for each of the second time frames a feature information corresponding to one or more characteristic features in the second time varying signal, which are related to the respective second time frame; and
a matching stage configured for comparing the first fingerprint and the second fingerprint, wherein each feature information of the first fingerprint is pairwise compared with each feature information of the second fingerprint,
wherein the matching stage comprises a similarity calculator stage configured for calculating for each pair of one of the feature informations of the first fingerprint and of one of the feature informations of the second fingerprint a similarity value,
wherein the matching stage comprises a matrix calculator stage configured for arranging the similarity values in a similarity matrix comprising dimensions of $L_a \times L_b$, wherein $L_a$ is a number of the feature informations of the first fingerprint and $L_b$ is a number of the feature informations of the second fingerprint, wherein an entry in the i-th row and j-th column of the similarity matrix is the similarity value calculated from the pair of the i-th feature information of the first fingerprint and of the j-th feature information of the second fingerprint, and
wherein the matching stage comprises a detection stage configured for detecting the partial matches by evaluating a plurality of diagonals of the similarity matrix, wherein each of the diagonals comprises a plurality of the similarity values, wherein the similarity values of each of the diagonals are arranged along a straight line, wherein each of the diagonals is arranged parallel to a main diagonal of the similarity matrix, wherein the main diagonal comprises the similarity values for which a row index i is equal to a column index j.

2. The device according to claim 1, wherein the characteristic features of each of the first time frames comprise a temporal and/or spectral shape of the first time varying signal, and wherein the characteristic features of each of the second time frames comprise a temporal and/or spectral shape of the second time varying signal.

3. The device according to claim 1, wherein the feature information of each of the first time frames is a feature vector comprising a plurality of elements, and wherein the feature information of each of the second time frames is a feature vector comprising a plurality of elements.

4. The device according to claim 3, wherein the feature vector of each of the first time frames is calculated using one or more spectra related to the respective first time frame, wherein each of the elements of the feature vector of each of the first time frames refers to a frequency band of the one or more spectra related to the respective first time frame, and wherein the feature vector of each of the second time frames is calculated using one or more spectra related to the respective second time frame, wherein each of the elements of the feature vector of each of the second time frames refers to a frequency band of the one or more spectra related to the respective second time frame.

5. The device according to claim 3, wherein each similarity value of the similarity matrix is calculated using a distance between the feature vector of the respective first time frame and the feature vector of the respective second time frame.

6. The device according to claim 5, wherein the similarity matrix is a binary similarity matrix, wherein each similarity value of the similarity matrix is, depending on a threshold for the respective distance, set to a first number indicating a frame match of the respective first time frame and the respective second time frame or to a second number indicating a frame mismatch of the respective first time frame and the respective second time frame.

7. The device according to claim 6, wherein the matching stage comprises a first pattern search stage configured for searching first patterns within the plurality of diagonals, which comprise one or more of the frame matches and zero or more frame mismatches being located between two of the frame matches of the respective first pattern, wherein a number of consecutive frame mismatches within the respective first pattern does not exceed a threshold for a maximum allowed number of consecutive frame mismatches within the respective first pattern, wherein a length of the respective first pattern from an earliest frame match of the respective first pattern to a latest frame match of the respective first pattern at least reaches a threshold for a minimum length of the first pattern, wherein the diagonals, in which at least one of the first patterns is found, are marked as candidate diagonals, and
  wherein the detection stage is configured for detecting the partial matches by evaluating the candidate diagonals of the similarity matrix.

8. The device according to claim 7, wherein the detection stage is configured in such way that each of the first patterns, in which a ratio between a number of frame matches of the respective first pattern and the length of the respective first pattern reaches a threshold for the ratio between the number of frame matches of the respective first pattern and the length of the respective first pattern, is detected as being one of the partial matches.

9. The device according to claim 7, wherein the matching stage comprises a second pattern search stage configured for searching second patterns within the candidate diagonals, which comprise one or more of the first patterns and one or more frame mismatches between two of the first patterns, wherein a number of consecutive frame mismatches between two of the first patterns does not exceed a threshold for a maximum allowed number of consecutive frame mismatches between two of the first patterns, wherein a length of the respective second pattern from an earliest frame match of the respective second pattern to a latest frame match of the respective second pattern at least reaches a threshold for a minimum length of the second pattern, and
  wherein the detection stage is configured for detecting the partial matches by evaluating the second patterns of the candidate diagonals.

10. The device according to claim 9, wherein the detection stage is configured in such way that each of the second patterns, in which a ratio between a number of frame matches of the respective second pattern and the length of the respective second pattern reaches a threshold for the ratio between the number of frame matches of the respective second pattern and the length of the respective second pattern, is detected as being one of the partial matches.

11. The device according to claim 1, wherein the matching stage comprises a clean-up stage configured for receiving at least some of the partial matches detected by the detection stage and for determining a longest partial match of the partial matches, wherein the longest partial match of the received partial matches is a main diagonal of a rectangular portion of the similarity matrix, wherein a further partial match of the received partial matches, which extends at least partially into the rectangular portion of the similarity matrix is discarded, unless following conditions are met:
  an absolute value of a horizontal distance between an earliest frame match of the longest received partial match and an earliest frame match of the further received partial match exceeds a distance threshold;
  an absolute value of a vertical distance between the earliest frame match of the longest received partial match and the earliest frame match of the further received partial match exceeds the distance threshold;
  an absolute value of a horizontal distance between a latest frame match of the longest received partial match and a latest frame match of the further received partial match exceeds a distance threshold;
  an absolute value of a vertical distance between the latest frame match of the longest received partial match and the latest frame match of the further received partial match exceeds the distance threshold; and
  a row index of the latest frame match of the further received partial match is greater than a row index of the latest frame match of the longest received partial match, in case that a column index of the latest frame match of the further received partial match is greater than a column index of the latest frame match of the longest received partial match,
  wherein the not discarded partial matches are outputted.

12. The device according to claim 1, wherein the matching stage comprises a noise and silence processing stage configured for receiving at least some of the partial matches detected by the detection stage and for discarding one of the received partial matches, in case that the one of the received partial matches is wrongly detected due to noisy or silent portions in the first time varying signal and the second time varying signal, wherein the one of the received partial matches is a main diagonal of a further rectangular portion of the similarity matrix, wherein a noise ratio between a number of the frame matches in the further rectangular portion of the similarity matrix excluding the frame matches of the main diagonal of the further rectangular portion of the similarity matrix and a number of the similarity values in the further rectangular portion of the similarity matrix excluding the similarity values of the main diagonal of the further rectangular portion of the similarity matrix is calculated, wherein the one of the received partial matches is discarded depending on a threshold for the noise ratio, wherein the not discarded partial matches are outputted.

13. A method for detecting partial matches between a first time varying signal and a second time varying signal, wherein the first time varying signal comprises a plurality of first portions over time and the second time varying signal comprises a plurality of second portions over time, wherein a partial match is detected if one of the first portions corresponds to one of the second portions, the method comprising:
  extracting a first fingerprint from the first time varying signal and a second fingerprint from the second time varying signal, by using a fingerprint extraction stage, wherein a plurality of first time frames is extracted from the first time varying signal for the first fingerprint, wherein a plurality of second time frames is extracted from the second time varying signal for the second fingerprint, wherein the first fingerprint comprises for each of the first time frames a feature information corresponding to one or more characteristic features in the first time varying signal, which are related to the respective first time frame, and wherein the second fingerprint comprises for each of the second time frames a feature information corresponding to one or more characteristic features in the second time varying signal, which are related to the respective second time frame; and
  comparing the first fingerprint and the second fingerprint by using a matching stage, wherein each feature information of the first fingerprint is pairwise compared with each feature information of the second fingerprint;

calculating, by using a similarity stage of the matching stage, a similarity value for each pair of one of the feature informations of the first fingerprint and of one of the feature informations of the second fingerprint;

arranging, by using a matrix calculator stage of the matching stage, the similarity values in a similarity matrix comprising dimensions of $L_a \times L_b$, wherein $L_a$ is a number of the feature informations of the first fingerprint and $L_b$ is a number of the feature informations of the second fingerprint, wherein an entry in the i-th row and j-th column of the similarity matrix is the similarity value calculated from the pair of the i-th feature information of the first fingerprint and of the j-th feature information of the second fingerprint; and detecting, by using a detection stage of the matching stage, the partial matches by evaluating a plurality of diagonals of the similarity matrix, wherein each of the diagonals comprises a plurality of the similarity values, wherein the similarity values of each of the diagonals are arranged along a straight line, wherein each of the diagonals is arranged parallel to a main diagonal of the similarity matrix, wherein the main diagonal comprises the similarity values for which a row index i is equal to a column index j.

14. A non-transitory digital storage medium having a computer program stored thereon to perform a method for detecting partial matches between a first time varying signal and a second time varying signal, wherein the first time varying signal comprises a plurality of first portions over time and the second time varying signal comprises a plurality of second portions over time, wherein a partial match is detected if one of the first portions corresponds to one of the second portions, the method comprising:

extracting a first fingerprint from the first time varying signal and a second fingerprint from the second time varying signal, by using a fingerprint extraction stage, wherein a plurality of first time frames is extracted from the first time varying signal for the first fingerprint, wherein a plurality of second time frames is extracted from the second time varying signal for the second fingerprint, wherein the first fingerprint comprises for each of the first time frames a feature information corresponding to one or more characteristic features in the first time varying signal, which are related to the respective first time frame, and wherein the second fingerprint comprises for each of the second time frames a feature information corresponding to one or more characteristic features in the second time varying signal, which are related to the respective second time frame; and comparing the first fingerprint and the second fingerprint by using a matching stage, wherein each feature information of the first fingerprint is pairwise compared with each feature information of the second fingerprint;

calculating, by using a similarity stage of the matching stage, a similarity value for each pair of one of the feature informations of the first fingerprint and of one of the feature informations of the second fingerprint;

arranging, by using a matrix calculator stage of the matching stage, the similarity values in a similarity matrix comprising dimensions of $L_a \times L_b$, wherein $L_a$ is a number of the feature informations of the first fingerprint and $L_b$ is a number of the feature informations of the second fingerprint, wherein an entry in the i-th row and j-th column of the similarity matrix is the similarity value calculated from the pair of the i-th feature information of the first fingerprint and of the j-th feature information of the second fingerprint; and detecting, by using a detection stage of the matching stage, the partial matches by evaluating a plurality of diagonals of the similarity matrix, wherein each of the diagonals comprises a plurality of the similarity values, wherein the similarity values of each of the diagonals are arranged along a straight line, wherein each of the diagonals is arranged parallel to a main diagonal of the similarity matrix, wherein the main diagonal comprises the similarity values for which a row index i is equal to a column index j, when said computer program is run by a computer.

* * * * *